(12) United States Patent
Morimoto

(10) Patent No.: US 11,740,521 B2
(45) Date of Patent: Aug. 29, 2023

(54) DISPLAY DEVICE HAVING COMMON ELECTRODES

(71) Applicant: Japan Display Inc., Tokyo (JP)

(72) Inventor: Masateru Morimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/669,517

(22) Filed: Feb. 11, 2022

(65) Prior Publication Data
US 2022/0163859 A1    May 26, 2022

Related U.S. Application Data

(63) Continuation of application No. 16/919,242, filed on Jul. 2, 2020, now Pat. No. 11,281,060, which is a (Continued)

(30) Foreign Application Priority Data

Jan. 11, 2018  (JP) ................................ 2018-002755

(51) Int. Cl.
| | |
|---|---|
| *G02F 1/1362* | (2006.01) |
| *G06F 3/044* | (2006.01) |
| *G02F 1/1333* | (2006.01) |
| *G02F 1/1339* | (2006.01) |
| *G02F 1/1343* | (2006.01) |
| *G02F 1/1368* | (2006.01) |
| *G06F 3/041* | (2006.01) |

(52) U.S. Cl.
CPC ...... *G02F 1/136286* (2013.01); *G02F 1/1368* (2013.01); *G02F 1/13338* (2013.01); *G02F 1/13394* (2013.01); *G02F 1/134363* (2013.01); *G02F 1/136227* (2013.01); *G06F 3/0412* (2013.01); *G06F 3/0443* (2019.05); *G02F 1/13396* (2021.01); *G02F 1/134318* (2021.01); *G02F 2201/123* (2013.01)

(58) Field of Classification Search
CPC .... G06F 3/0446; G06F 3/0412; G06F 3/0443; G02F 1/136227; G02F 1/1368; G02F 1/134363; G02F 1/136286; G02F 1/13338; G02F 1/13394; G02F 1/134318; G02F 2201/123; G02F 1/13396; G09F 9/30
See application file for complete search history.

(56) References Cited

U.S. PATENT DOCUMENTS

| | | | | |
|---|---|---|---|---|
| 6,069,678 | A * | 5/2000 | Sakamoto | ......... G02F 1/134363 349/139 |
| 8,625,065 | B2 * | 1/2014 | Chang | ................... H01L 27/124 349/141 |

(Continued)

*Primary Examiner* — Kwang-Su Yang
(74) *Attorney, Agent, or Firm* — Michael Best & Friedrich LLP

(57) ABSTRACT

According to one embodiment, a display device includes a first common electrode, a second common electrode spaced apart from the first common electrode, a first signal line overlapping the first common electrode and the second common electrode, a first metal line overlapping the first signal line and the first common electrode, and a second metal line overlapping the first signal line and the second common electrode and spaced apart from the first metal line. The first metal line includes an extension portion extending between the first common electrode and the second common electrode.

6 Claims, 15 Drawing Sheets

Related U.S. Application Data continuation of application No. PCT/JP2018/045183, filed on Dec. 7, 2018.

(56) References Cited

U.S. PATENT DOCUMENTS

| | | | |
|---|---|---|---|
| 2015/0346572 A1* | 12/2015 | Hirosawa | G02F 1/134363 |
| | | | 349/43 |
| 2016/0327885 A1 | 11/2016 | Hamada | |
| 2017/0371199 A1* | 12/2017 | Maede | G02F 1/136286 |
| 2018/0239476 A1* | 8/2018 | Yoshida | H01L 27/124 |
| 2019/0033636 A1* | 1/2019 | Morinaga | H01L 27/1248 |

* cited by examiner

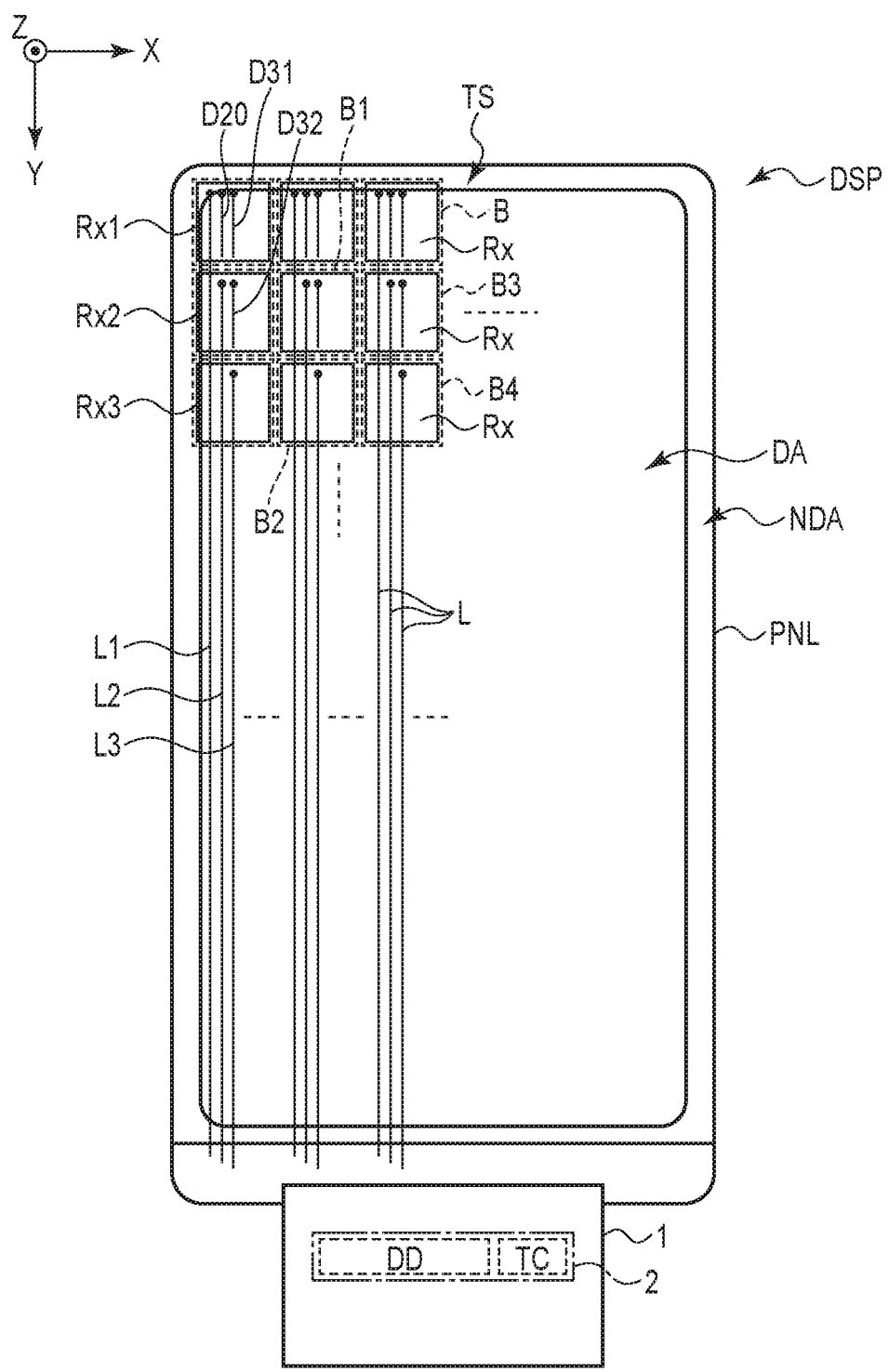
F I G. 2

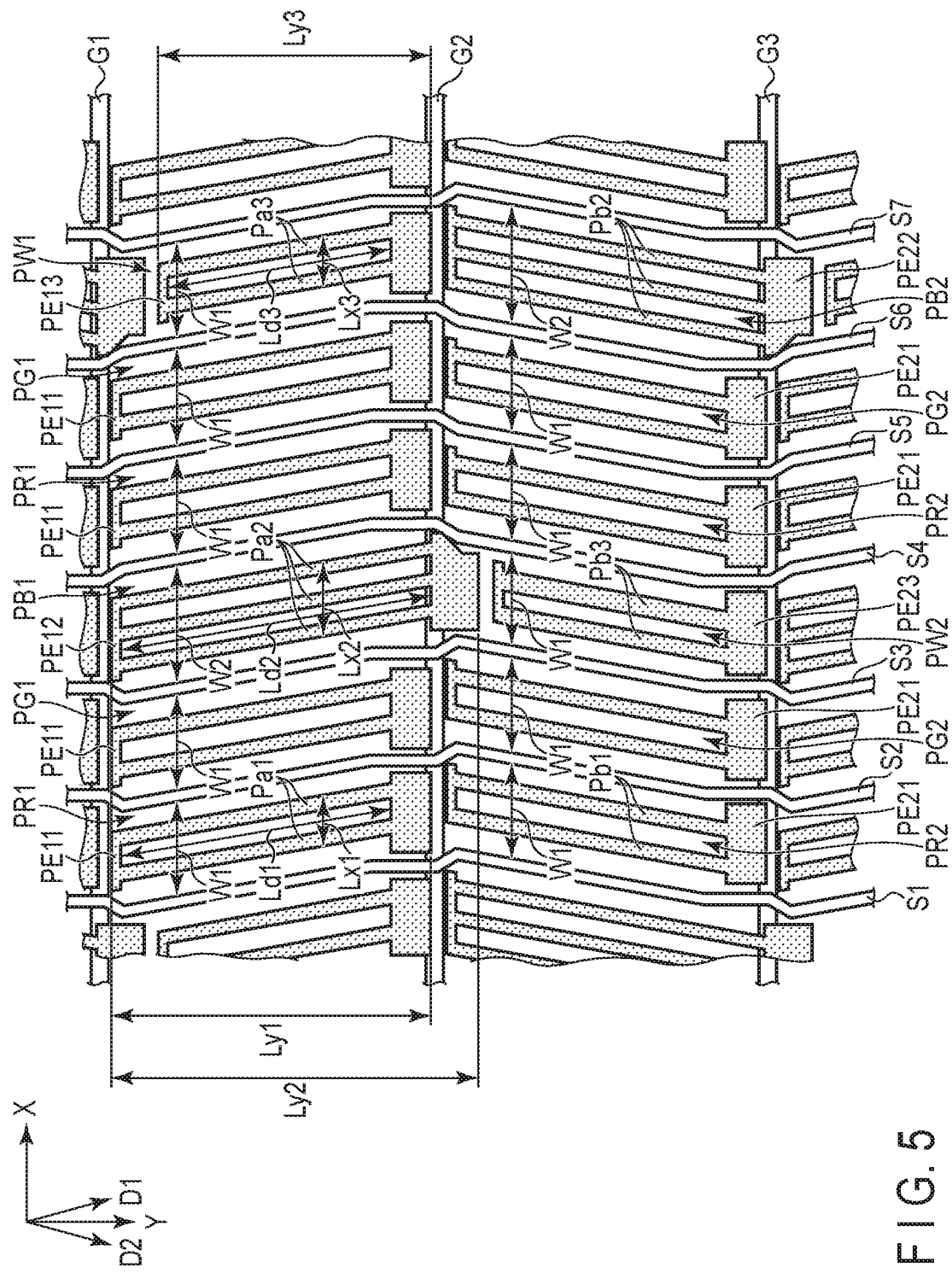
F I G. 5

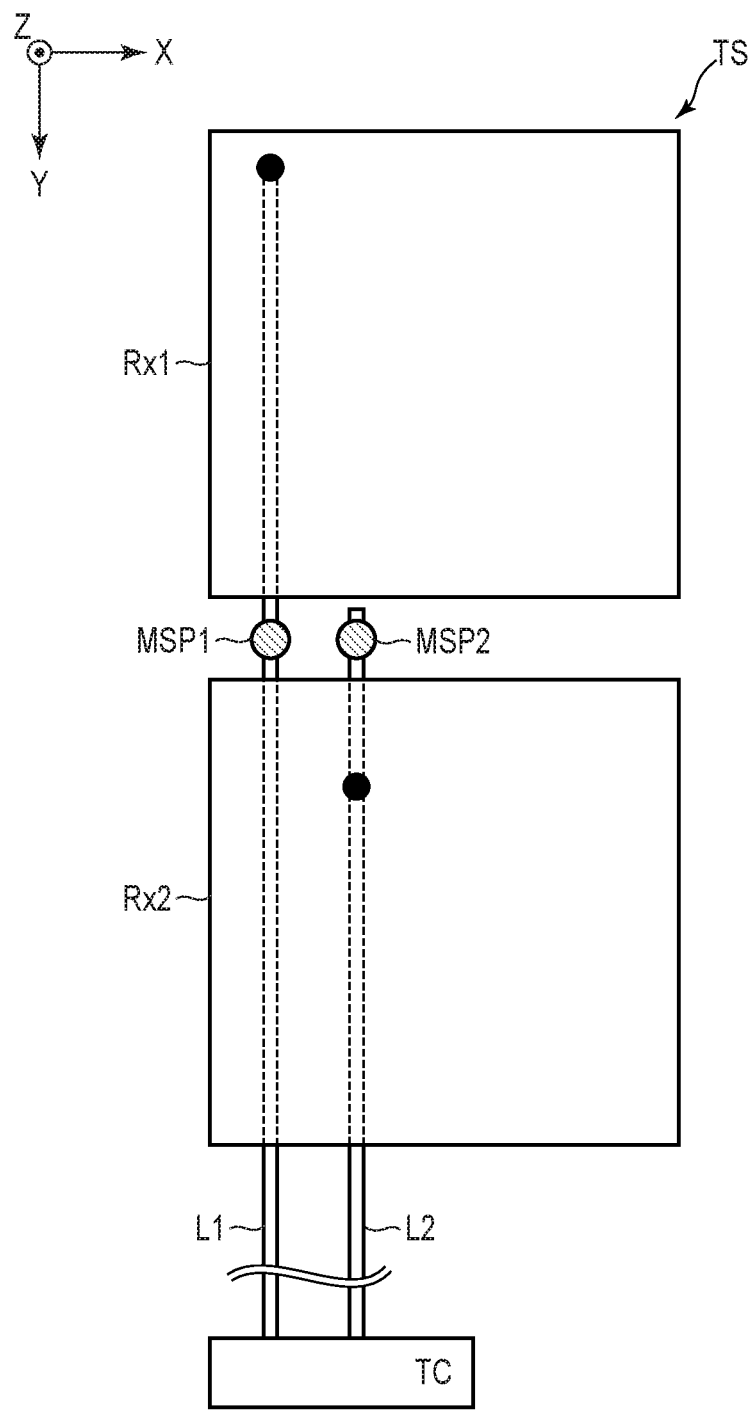
F I G. 15

DISPLAY DEVICE HAVING COMMON ELECTRODES

CROSS-REFERENCE TO RELATED APPLICATIONS

This application is a Continuation Application U.S. patent application Ser. No. 16/919,242 filed on Jul. 2, 2020, which, in turn, is a Continuation Application of PCT Application No. PCT/JP2018/045183, filed Dec. 7, 2018 and based upon and claiming the benefit of priority from Japanese Patent Application No. 2018-002755, filed Jan. 11, 2018, the entire contents of all of which are incorporated herein by reference.

FIELD

Embodiments described herein relate generally to a display device and a touch sensor.

BACKGROUND

Recently, various technologies for improving the display quality of display devices have been considered. For example, a technology in which a common metal line overlapping a video signal line comprises a through-hole and the distal end of a spacer is provided inside the through-hole is disclosed. In another example, a technology in which, of three pixel electrodes arranged in one direction, the contact portion of one pixel electrode is provided at a position deviating from the same straight line of the contact portions of the other two pixel electrodes is disclosed.

BRIEF DESCRIPTION OF THE DRAWINGS

FIG. 2 is a plan view showing a structural example of a touch sensor TS.

FIG. 5 is a plan view showing an example of a pixel layout.

FIG. 15 is a plan view in which a part of the touch sensor TS shown in FIG. 2 is enlarged.

DETAILED DESCRIPTION

Figure 1:
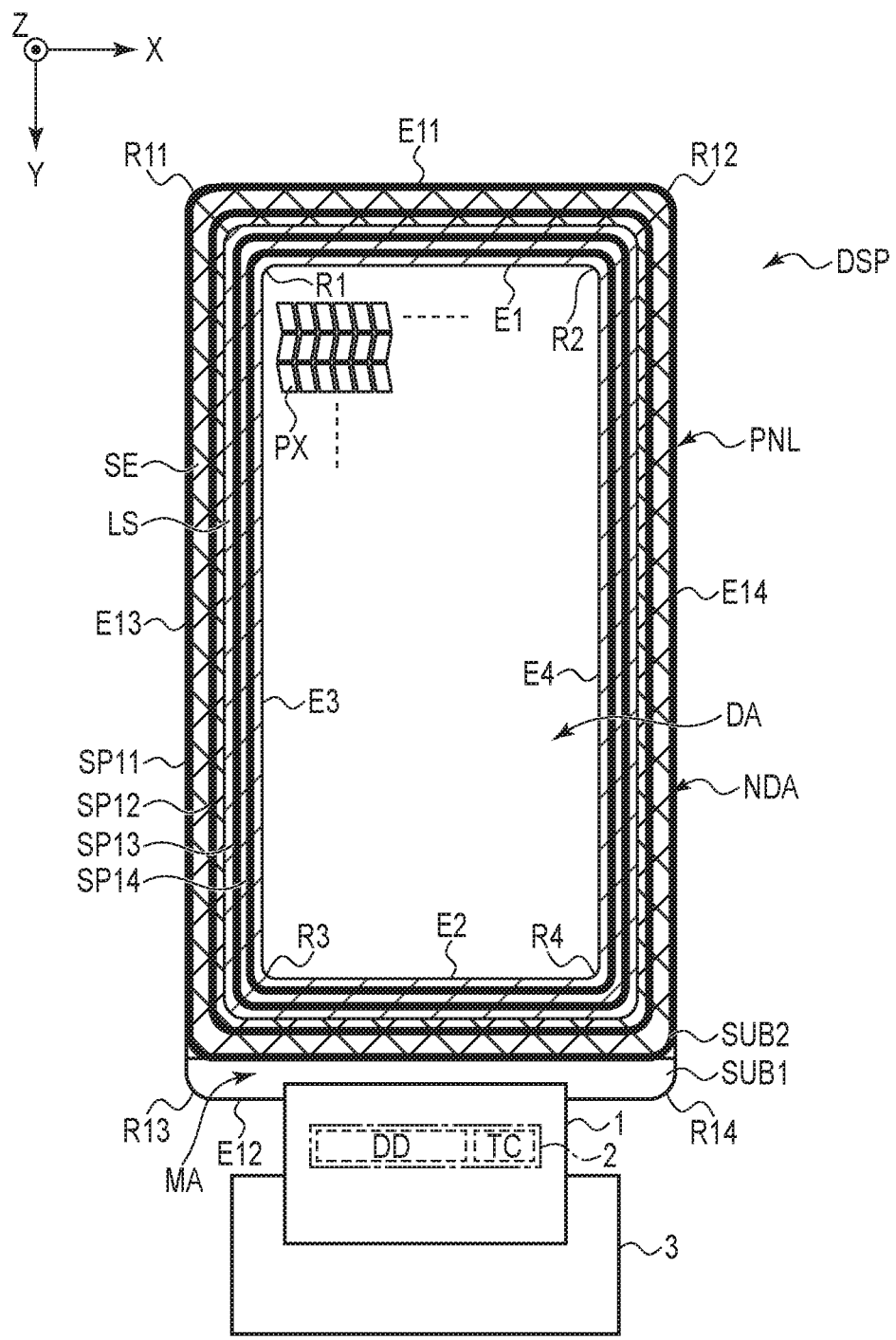
FIG. 1 is a plan view showing the external appearance of a display device DSP according to the present embodiment.

In general, according to one embodiment, there is provided a display device comprising a first common electrode, a second common electrode spaced apart from the first common electrode, a first signal line overlapping the first common electrode and the second common electrode, a first metal line overlapping the first signal line and the first common electrode, and a second metal line overlapping the first signal line and the second common electrode and spaced apart from the first metal line. The first metal line comprises an extension portion extending between the first common electrode and the second common electrode.

According to another embodiment, there is provided a touch sensor comprising a first sensor electrode, a second sensor electrode spaced apart from the first sensor electrode, a first sensor line overlapping the first sensor electrode and the second sensor electrode and electrically connected to the first sensor electrode, a second sensor line overlapping the second sensor electrode without overlapping the first sensor electrode, extending between the first sensor electrode and the second sensor electrode and electrically connected to the second sensor electrode, a first spacer overlapping the first sensor line between the first sensor electrode and the second sensor electrode, and a second spacer overlapping the second sensor line between the first sensor electrode and the second sensor electrode.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the present embodiment, as an example of a display device DSP, a liquid crystal display device is explained. The main structure disclosed in the present embodiment can be applied to self-luminous display devices comprising an organic electroluminescent display element, etc., electronic paper display devices comprising an electrophoretic element, etc., display devices to which micro-electromechanical systems (MEMS) are applied, and display devices to which electrochromism is applied.

FIG. 1 is a plan view showing the external appearance of the display device DSP according to the present embodiment. For example, a first direction X, a second direction Y and a third direction Z are perpendicular to each other. However, they may intersect one another at an angle other than 90 degrees. The first direction X and the second direction Y are equivalent to directions parallel to the main surfaces of the substrates constituting the display device DSP. The third direction Z is equivalent to the thickness direction of the display device DSP. In this specification, the direction of the arrow indicating the third direction Z is referred to as "upward" (or toward the upper side). The direction opposite to the arrow indicating the third direction Z is referred to as "downward" (or toward the lower side).

It is assumed that an observation position for observing the display device DSP is present on the point side of the arrow indicating the third direction Z. The observation of the X-Y plane defined by the first direction X and the second direction Y at the observation position is referred to as a plan view.

Here, a plan view of the display device DSP in the X-Y plane is shown. The display device DSP comprises a display panel PNL, a flexible printed circuit 1, an IC chip 2 and a circuit board 3.

The display panel PNL is a liquid crystal display panel, and comprises a first substrate SUB1, a second substrate SUB2, a liquid crystal layer LC to be described later, a sealant SE, light-shielding layer LS and spacers SP11 to SP14. The display panel PNL comprises a display portion DA for displaying an image, and a frame-shaped non-display portion NDA surrounding the display portion DA. The second substrate SUB2 faces the first substrate SUB1. The first substrate SUB1 comprises a mounting portion MA extending in the second direction Y compared with the second substrate SUB2.

The sealant SE is located in the non-display portion NDA, causes the first substrate SUB1 to adhere to the second substrate SUB2 and seals the liquid crystal layer LC. Light-shielding layer LS is located in the non-display portion NDA. The sealant SE is provided at a position overlapping light-shielding layer LS in a plan view. In FIG. 1, the area in which the sealant SE is provided and the area in which light-shielding layer LS is provided are shown by different hatch lines, and the area in which the sealant SE overlaps light-shielding layer LS is shown by cross hatching. Light-shielding layer LS is provided in the second substrate SUB2.

All of spacers SP11 to SP14 are located in the non-display portion NDA. Spacer SP11 is located in the outermost circumference of the display panel PNL. Spacer SP12 is located so as to be closer to the display portion DA side than spacer SP11. Spacers SP11 and SP12 overlap the sealant SE. Spacers SP13 and SP14 are located so as to be closer to the display portion DA side than the sealant SE. Spacers SP11 to SP14 are provided in, for example, the second substrate SUB2. However, spacers SP11 to SP14 may be provided in the first substrate SUB1.

The display portion DA is located on the internal side surrounded by light-shielding layer LS. The display portion DA comprises a plurality of pixels PX arranged in matrix in the first direction X and the second direction Y. The display portion DA comprises a pair of sides E1 and E2 extending in the first direction X, a pair of sides E3 and E4 extending in the second direction Y, and four round portions R1 to R4. The display panel PNL comprises a pair of sides E11 and E12 extending in the first direction X, a pair of sides E13 and E14 extending in the second direction Y, and four round portions R11 to R14. Round portions R11 to R14 are located on the external sides of round portions R1 to R4, respectively. The radius of curvature of round portion R11 may be equal to or different from that of round portion R1.

The flexible printed circuit 1 is mounted on the mounting portion MA and connected to the circuit substrate 3. The IC chip 2 is mounted on the flexible printed circuit 1. The IC chip 2 may be mounted on the mounting portion MA. The IC chip 2 comprises a built-in display driver DD which outputs a signal necessary for image display in a display mode for displaying an image. In the example shown in the figure, the IC chip 2 comprises a built-in touch controller TC which controls a touch sensing mode for detecting the approach or contact of an object to/with the display device DSP. In the figure, the IC chip 2 is shown by one-dot chain lines, and the display driver DD and the touch controller TC are shown by dashed lines.

The display panel PNL of the present embodiment may be any one of a transmissive display panel comprising a transmissive display function for displaying an image by selectively transmitting light from the rear side of the first substrate SUB1, a reflective display panel comprising a reflective display function for displaying an image by selectively reflecting light from the front side of the second substrate SUB2 and a transreflective display panel comprising a transmissive display function and a reflective display function.

Here, the explanation of the detailed structure of the display panel PNL is omitted. The display panel PNL may comprise a structure corresponding to any one of a display mode using a lateral electric field along the main surfaces of the substrates, a display mode using a longitudinal electric field along the normal of the main surfaces of the substrates, a display mode using an inclined electric field inclined at a tilt with respect to the main surfaces of the substrates and a display mode using combinations of the above lateral electric field, longitudinal electric field and inclined electric field depending on the need. The main surfaces of the substrates are surfaces parallel to the X-Y plane defined by the first direction X and the second direction Y.

FIG. 2 is a plan view showing a structural example of a touch sensor TS. Here, the touch sensor TS is explained as a self-capacitive touch sensor. However, the touch sensor TS may be a mutual-capacitive touch sensor. The touch sensor TS comprises a plurality of sensor electrodes Rx (Rx1, Rx2, ... ) and a plurality of sensor lines L (L1, L2, ... ). The sensor electrodes Rx are located in the display portion DA, and are arranged in matrix in the first direction X and the second direction Y. One sensor electrode Rx constitutes one sensor block B. A sensor block B is a minimum unit which allows touch sensing. The sensor lines L extend in the second direction Y and are arranged in the first direction X in the display portion DA. For example, the sensor lines L are provided at positions overlapping signal lines S to be described later. The sensor lines L extend to the non-display portion NDA and are electrically connected to the IC chip 2 via the flexible printed circuit 1.

Here, this specification focuses on the relationship between sensor lines L1 to L3 arranged in the first direction X and sensor electrodes Rx1 to Rx3 arranged in the second direction Y. Sensor line L1 overlaps sensor electrodes Rx1 to Rx3 and is electrically connected to sensor electrode Rx1.

Sensor line L2 overlaps sensor electrodes Rx2 and Rx3 and is electrically connected to sensor electrode Rx2. In the example shown in the figure, sensor line L2 does not extend between sensor electrode Rx1 and sensor electrode Rx2. However, sensor line L2 may extend between sensor electrode Rx1 and sensor electrode Rx2. Dummy line D20 is spaced apart from sensor line L2. Dummy line D20 overlaps sensor electrode Rx1 and is electrically connected to sensor electrode Rx1. Sensor line L2 and dummy line D20 are located on the same signal line.

Sensor line L3 overlaps sensor electrode Rx3 and is electrically connected to sensor electrode Rx3. In the example shown in the figure, sensor line L3 does not extend between sensor electrode Rx2 and sensor electrode Rx3. However, sensor line L3 may extend between sensor electrode Rx2 and sensor electrode Rx3. Dummy line D31 overlaps sensor electrode Rx1 and is electrically connected to sensor electrode Rx1. Dummy line D32 is spaced apart from dummy line D31 and sensor line L3. Dummy line D32 overlaps sensor electrode Rx2 and is electrically connected to sensor electrode Rx2. Sensor line L3 and dummy lines D31 and D32 are located on the same signal line.

In a touching sensing mode, the touch controller TC applies touch drive voltage to the sensor lines L. In this way, touch drive voltage is applied to the sensor electrodes Rx, and the sensor electrodes Rx performs sensing. A sensor signal corresponding to the result of sensing in the sensor electrodes Rx is output to the touch controller TC via the sensor lines L. The touch controller TC or an external host detect whether or not an object approaches or comes in contact with the display device DSP and the coordinate of the position of the object based on the sensor signal.

In a display mode, the sensor electrodes Rx function as common electrodes CE to which common voltage (Vcom) is applied. For example, common voltage is applied by a voltage application portion included in the display driver DD via the sensor lines L.

Figure 3:
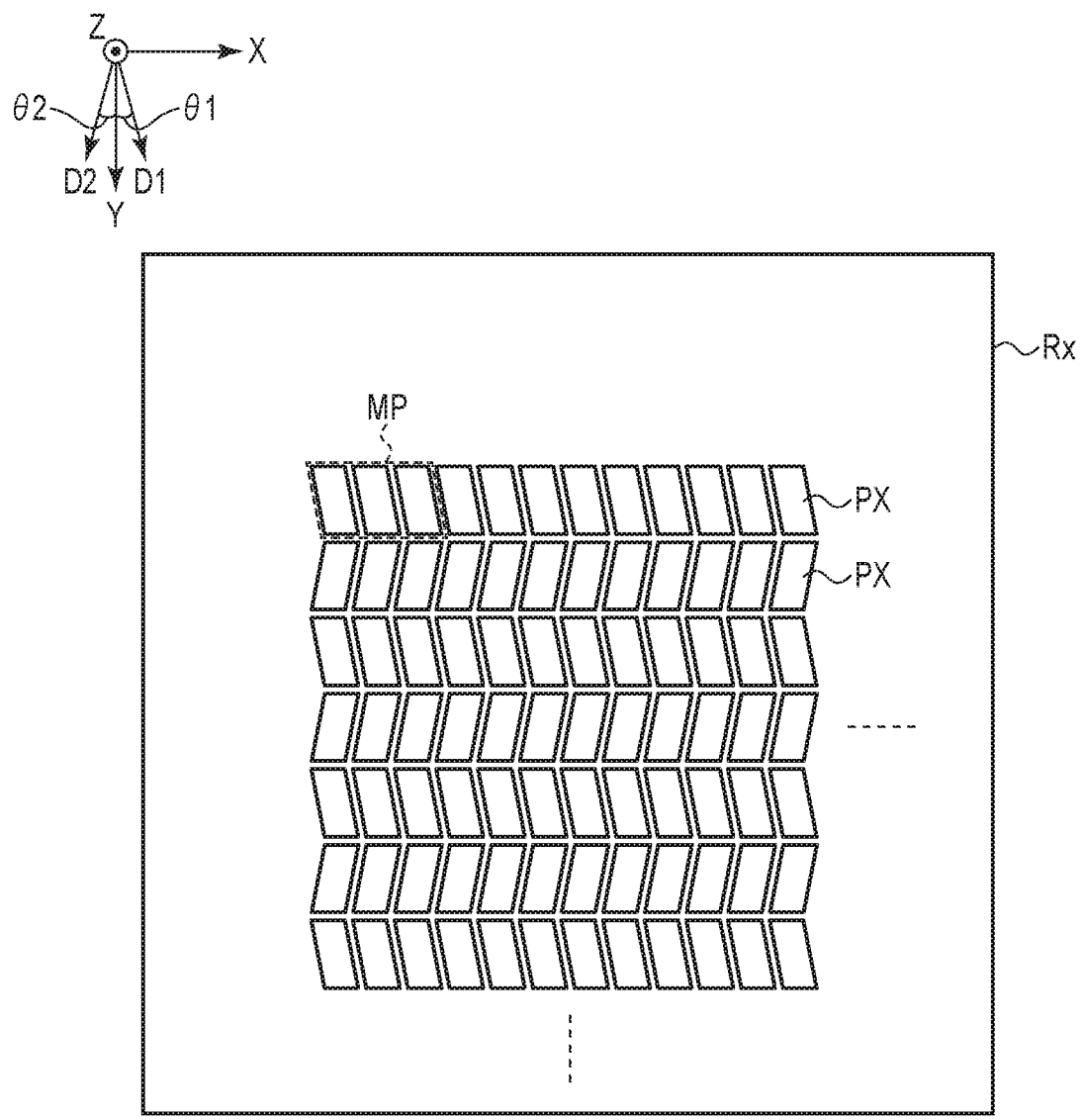
FIG. 3 is a plan view showing the sensor electrode Rx and the pixels PX shown in FIG. 2.

FIG. 3 is a plan view showing the sensor electrode Rx and the pixels PX shown in FIG. 2. In FIG. 3, a direction intersecting with the second direction Y at an acute angle counterclockwise is defined as direction D1, and a direction intersecting with the second direction Y at an acute angle clockwise is defined as direction D2. Angle θ1 between the second direction Y and direction D1 is substantially equal to angle θ2 between the second direction Y and direction D2.

One sensor electrode Rx is provided over a plurality of pixels PX. In the example shown in the figure, the pixels PX located in the odd-numbered rows in the second direction Y extend in direction D1. The pixels PX located in the even-numbered rows in the second direction Y extend in direction D2. Here, each pixel PX indicates a minimum unit which can be separately controlled based on a pixel signal, and may be referred to as a subpixel. A minimum unit for realizing color display may be referred to as a main pixel MP. A main pixel MP is structured so as to comprise a plurality of subpixels PX which display colors different from each other. For example, a main pixel MP comprises, as subpixels PX, a red pixel which displays red, a green pixel which displays green and a blue pixel which displays blue. A main pixel MP may comprise a white pixel which displays white.

For example, in one sensor electrode Rx, 60 to 70 main pixels MP are provided in the first direction X, and 60 to 70 main pixels MP are provided in the second direction.

Figure 4:
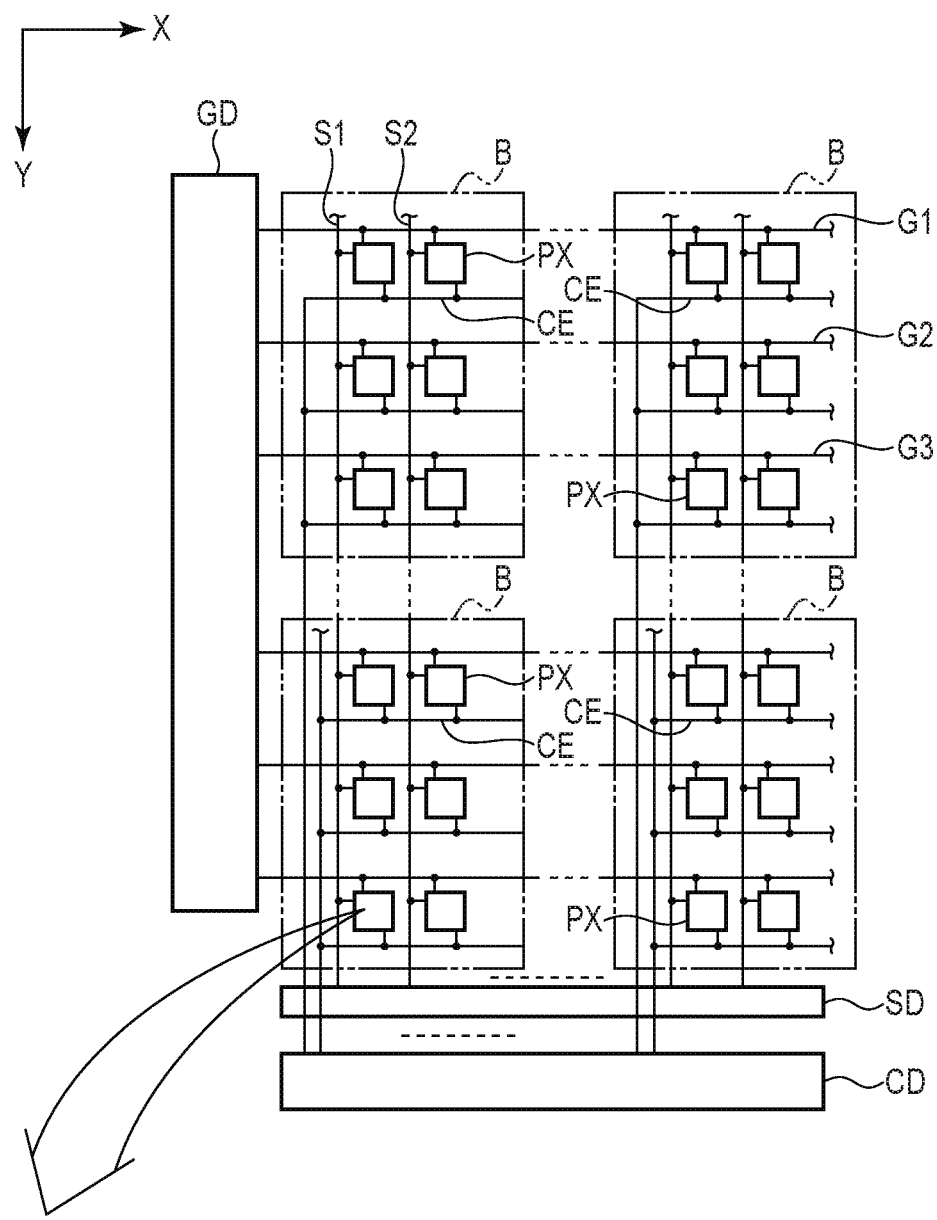
FIG. 4 is a diagram showing the basic structure and equivalent circuit of the pixels PX.
Figure 4:
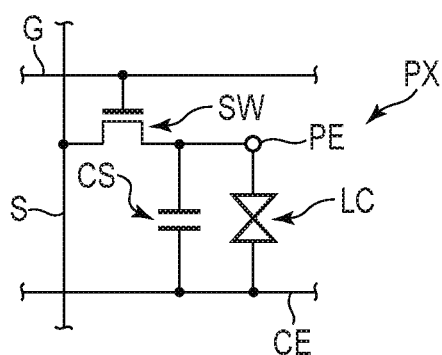

FIG. 4 is a diagram showing the basic structure and equivalent circuit of the pixels PX. A plurality of scanning lines G1, G2, . . . , are connected to a scanning line drive circuit GD. A plurality of signal lines S1, S2, . . . , are connected to a signal line drive circuit SD. The scanning lines G or the signal lines S may not linearly extend. They may be partially curved. For example, it is assumed that the signal lines S extend in the second direction Y even if they are partially curved.

A common electrode CE is provided in each sensor block B. Each common electrode CE is connected to the voltage supply portion CD of common voltage (Vcom) and is provided over a plurality of pixels PX. Each common electrode CE is also connected to the touch controller TC and functions as a sensor electrode Rx as described above.

Each pixel PX comprises a switching element SW, a pixel electrode PE, a common electrode CE, a liquid crystal layer LC, etc. Each switching element SW is structured by, for example, a thin-film transistor (TFT), and is electrically connected to a corresponding scanning line G and a corresponding signal line S. Each scanning line G is connected to the switching elements SW in the pixels PX arranged in the first direction X. Each signal line S is connected to the switching elements SW in the pixels PX arranged in the second direction Y. Each pixel electrode PE is electrically connected to a corresponding switching element SW. Each pixel electrode PE faces the common electrode CE, and drives the liquid crystal layer LC by an electric field generated between the pixel electrode PE and the common electrode CE. Storage capacitance CS is formed between, for example, an electrode having the same potential as the common electrode CE and an electrode having the same potential as the pixel electrode PE.

FIG. 5 is a plan view showing an example of a pixel layout. Scanning lines G1 to G3 linearly extend in the first direction X and are arranged at intervals in the second direction Y. Signal lines S1 to S7 extend substantially in the second direction Y and are arranged at intervals in the first direction X.

Between scanning lines G1 and G2, red pixel PR1, green pixel PG1, blue pixel PB1, red pixel PR1, green pixel PG1 and white pixel PW1 are arranged in this order in the first direction X.

Between scanning lines G1 and G2, signal lines S1 to S3 are arranged at regular intervals W1, and signal lines S4 to S7 are arranged at regular intervals W1, and interval W2 between signal lines S3 and S4 is greater than interval W1. Blue pixel PB1 is located between signal lines S3 and S4. Both interval W1 and interval W2 are lengths in the first direction X.

In red pixel PR1 and green pixel PG1, pixel electrodes PE11 having the same shape as each other are respectively provided. In blue pixel PB1, pixel electrode PE12 larger than pixel electrode PE11 is provided. In white pixel PW1, pixel electrode PE13 smaller than pixel electrode PE11 is provided. With regard to length Lx in the first direction X, pixel electrodes PE11 and PE13 have equal lengths Lx1, and pixel electrode PE12 has length Lx2 greater than length Lx1. With regard to length Ly in the second direction Y, pixel electrodes PE11 have length Ly1, and pixel electrode PE12 has length Ly2 greater than length Ly1, and pixel electrode PE13 has length Ly3 less than length Ly1. Pixel electrodes PE11 and PE13 are located between scanning lines G1 and G2. Pixel electrode PE12 is located between scanning lines G1 and G2, and intersects with scanning line G2.

Pixel electrodes PE11 to PE13 comprise band electrodes Pa1 to Pa3 extending in direction D1, respectively. In the example shown in the figure, the number of band electrodes Pa1 is two, and the number of band electrodes Pa3 is two, and the number of band electrodes Pa2 is three. Band electrodes Pa1 to Pa3 are located between scanning lines G1 and G2. With regard to length Ld in direction D1, band electrodes Pa1 have length Ld1, and band electrodes Pa2 have length Ld2 greater than length Ld1, and band electrodes Pa3 have length Ld3 less than length Ld1.

Between scanning lines G2 and G3, red pixel PR2, green pixel PG2, white pixel PW2, red pixel PR2, green pixel PG2 and blue pixel PB2 are arranged in this order in the first direction X. Red pixels PR1 and PR2, green pixels PG1 and PG2, blue pixel PB1 and white pixel PW2, and white pixel PW1 and blue pixel PB2 are provided side by side in the second direction Y.

Between scanning lines G2 and G3, signal lines S1 to S6 are arranged at regular intervals W1, and interval W2 between signal lines S6 and S7 is greater than interval W1. Blue pixel PB2 is located between signal lines S6 and S7.

Although details are not explained, in red pixel PR2 and green pixel PG2, pixel electrodes PE21 having the same shape are respectively provided. In blue pixel PB2, pixel electrode PE22 larger than pixel electrodes PE21 is provided. In white pixel PW2, pixel electrode PE23 smaller than pixel electrodes PE21 is provided. Pixel electrodes PE21 to PE23 comprise band electrodes Pb1 to Pb3 extending in direction D2, respectively. Pixel electrodes PE21 to PE23 have the same shapes as pixel electrodes PE11 to PE13, respectively. The width of each band electrode Pb3 in the first direction X is greater than the width of each band electrode Pb1 in the first direction X. The width of each band electrode Pb2 in the first direction X is less than the width of each band electrode Pb1 in the first direction X.

Figure 6:
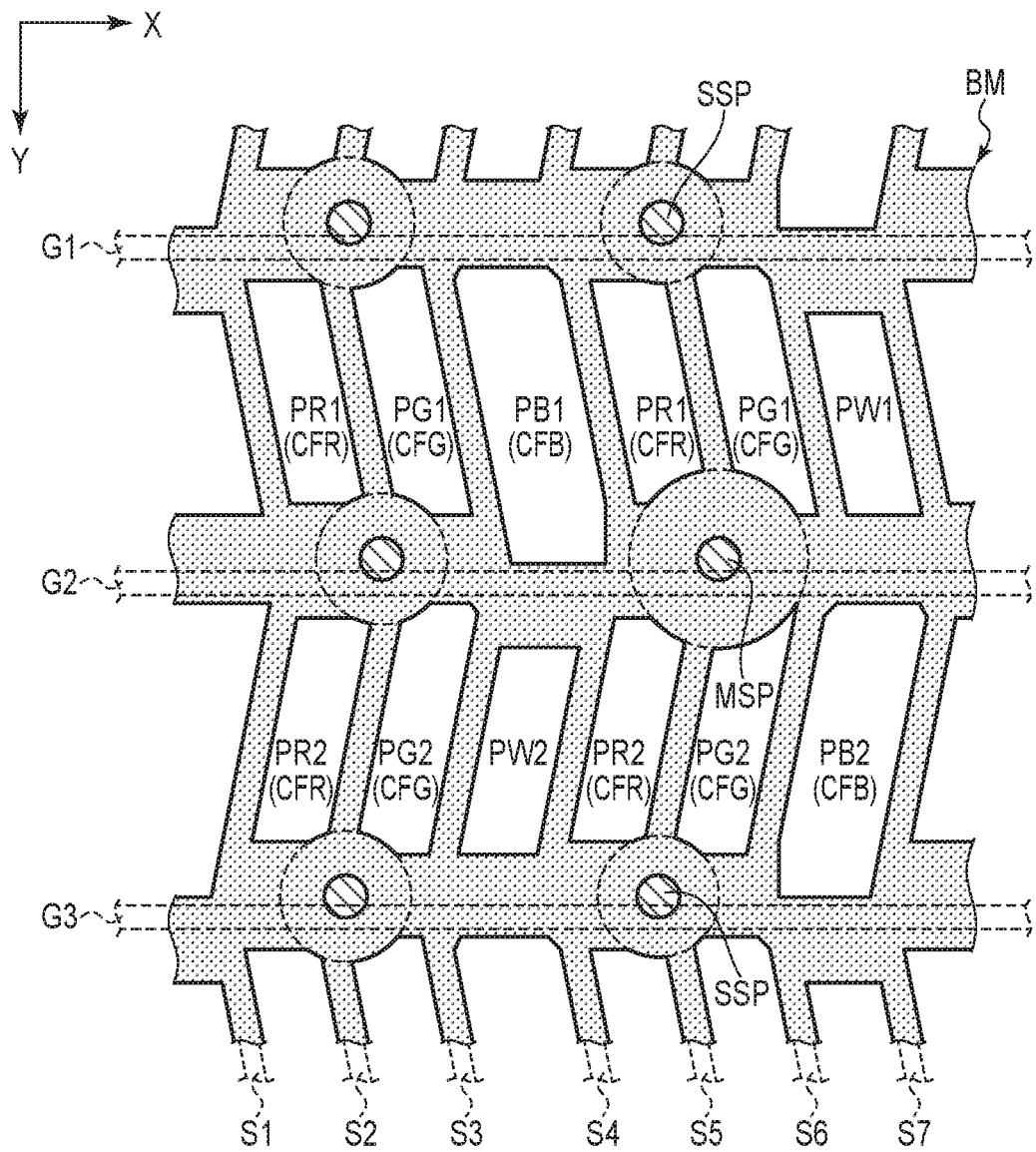
FIG. 6 is a plan view showing light-shielding layer BM corresponding to the pixel layout shown in FIG. 5.

FIG. 6 is a plan view showing light-shielding layer BM corresponding to the pixel layout shown in FIG. 5. Light-shielding layer BM is formed in a lattice pattern, and overlaps scanning lines G1 to G3 and signal lines S1 to S7 in a plan view. This light-shielding layer BM surrounds each of red pixels PR1 and PR2, green pixels PG1 and PG2, blue pixels PB1 and PB2 and white pixels PW1 and PW2. Light-shielding layer BM is formed of the same light-shielding material as the light-shielding portion LS of the non-display portion NDA shown in FIG. 1, and is connected to light-shielding layer LS in the non-display portion NDA.

Signal line S5 is located between red pixel PR1 and green pixel PG1 and between red pixel PR2 and green pixel PG2. Each of a main spacer MSP and sub-spacers SSP overlaps signal line S5. The main spacer MSP forms a cell gap between the first substrate SUB1 and the second substrate SUB2. The sub-spacers SSP have a height less than the height of the main spacer MSP.

Light-shielding layer BM is extended so as to be substantially concentric with the sub-spacers SSP around the sub-spacers SSP. In addition, light-shielding layer BM is extended so as to be substantially concentric with the main spacer MSP around the main spacer MSP.

A red color filter CFR is provided in red pixels PR1 and PR2. A green color filter CFG is provided in green pixels PG1 and PG2. A blue color filter CFB is provided in blue pixels PB1 and PB2.

Figure 7:
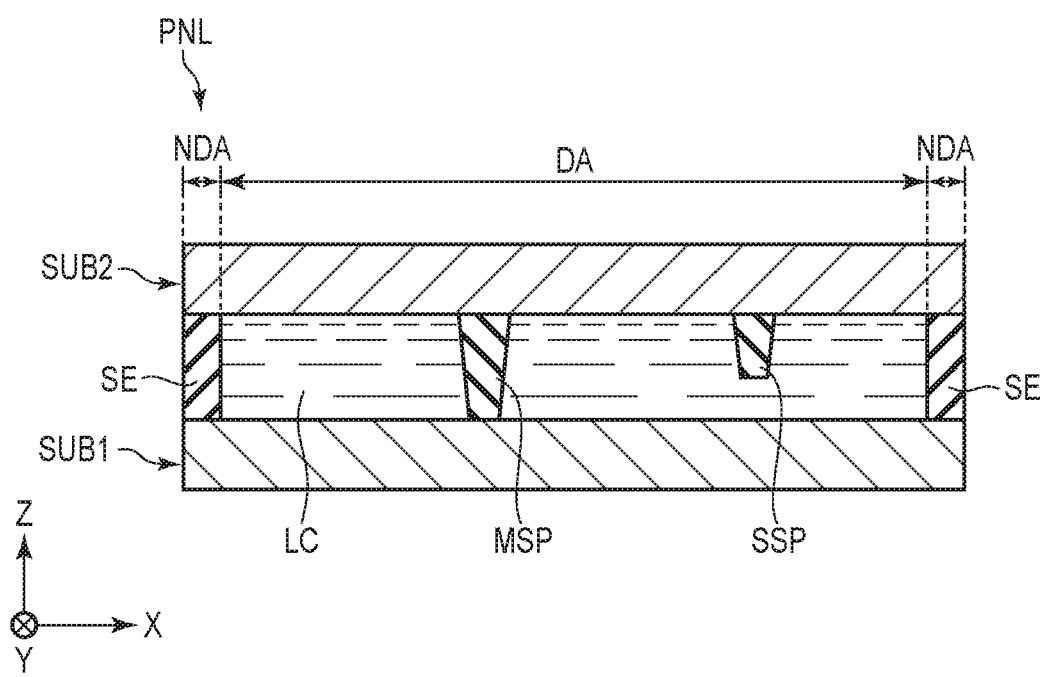
FIG. 7 is a cross-sectional view showing the structure of a display panel PNL.

FIG. 7 is a cross-sectional view showing the structure of the display panel PNL. The main spacer MSP and the sub-spacer SSP are located between the first substrate SUB1 and the second substrate SUB2. The main spacer MSP is in contact with the first substrate SUB1 and the second substrate SUB2, and holds a cell gap between the first substrate SUB1 and the second substrate SUB2. The sub-spacer SSP is in contact with one of the first substrate SUB1 and the second substrate SUB2 and is spaced apart from the other substrate. In the example shown in the figure, the sub-spacer SSP is spaced apart from the first substrate SUB1 and in contact with the second substrate SUB2. The structure is not limited to the example in which the main spacer MSP and the sub-spacer SSP are provided in the second substrate SUB2 as shown in the figure. The main spacer MSP and the sub-spacer SSP may be provided in the first substrate SUB1 or may be provided in separate substrates. Alternatively, the sub-spacer SSP may be omitted. The sealant SE is provided in the non-display portion NDA to attach the first substrate SUB1 to the second substrate SUB2 in a state where a cell gap is formed. The liquid crystal layer LC is held between the first substrate SUB1 and the second substrate SUB2.

Figure 8:
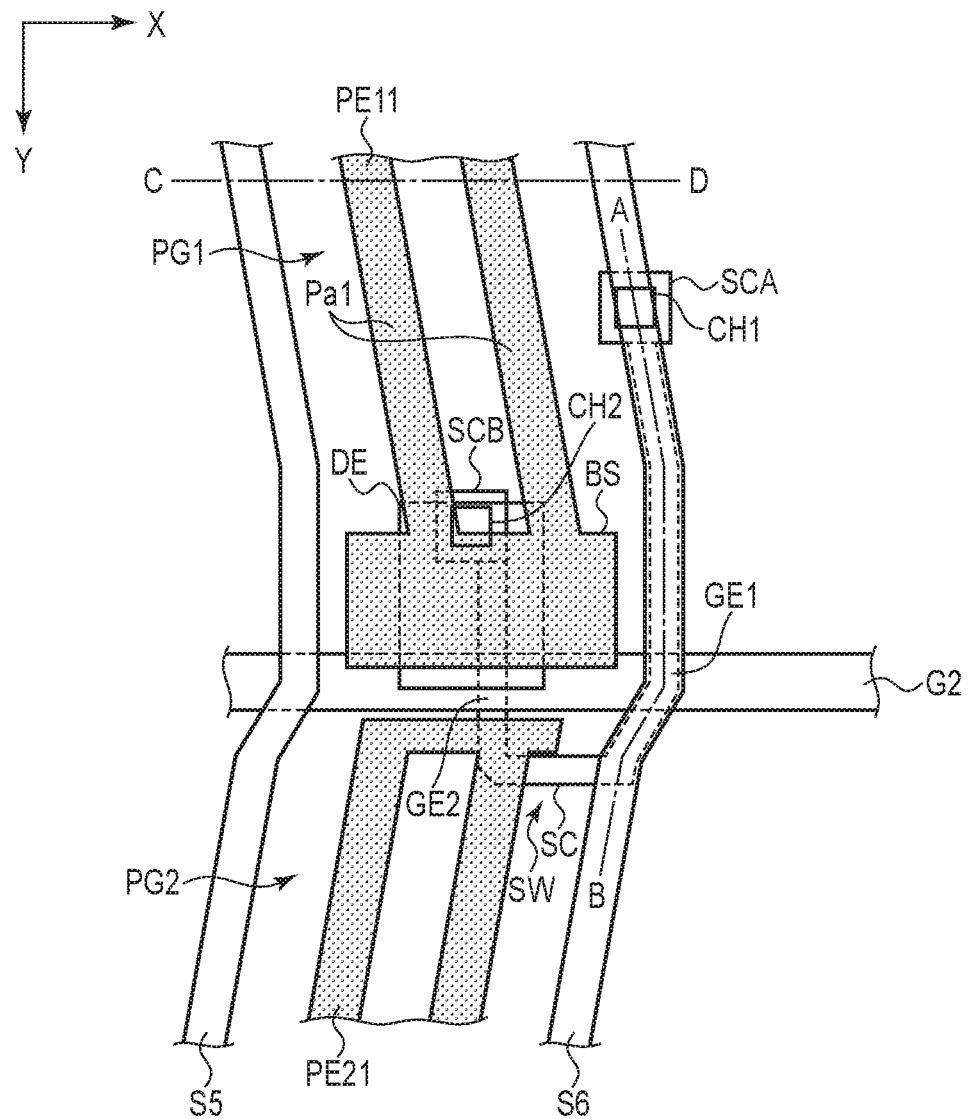
FIG. 8 is a plan view showing an example of the pixels shown in FIG. 5.

FIG. 8 is a plan view showing an example of the pixels shown in FIG. 5. Here, this specification focuses on green pixel PG1 surrounded by scanning lines G1 and G2 and signal lines S5 and S6 shown in FIG. 5 and explains the main portions.

The switching element SW is electrically connected to scanning line G2 and signal line S6. The switching element SW shown in the figure comprises a double-gate structure. The switching element SW comprises a semiconductor layer SC and a drain electrode DE. In the switching element SW, the drain electrode DE may be referred to as a source electrode. The semiconductor layer SC is provided so as to partially overlap signal line S6. The other portion extends between signal line S5 and S6. The semiconductor layer SC is formed in substantially a U-shape. The semiconductor layer SC intersects with scanning line G2 in the area overlapping signal line S6 and between signal lines S5 and S6. In scanning line G2, the areas overlapping the semiconductor layer SC function as gate electrodes GE1 and GE2, respectively. The semiconductor layer SC is electrically connected to signal line S6 through contact hole CH1 in an end portion SCA, and is electrically connected to the drain electrode DE through contact hole CH2 in the other end portion SCB. The drain electrode DE is formed in an island shape and provided between signal lines S5 and S6.

Pixel electrode PE11 comprises a base portion BS integrally formed with band electrodes Pa1. The base portion BS overlaps the drain electrode DE. The base portion BS is electrically connected to the drain electrode DE. The connection portion connecting pixel electrode PE11 and the switching element SW is described later.

Figure 9:
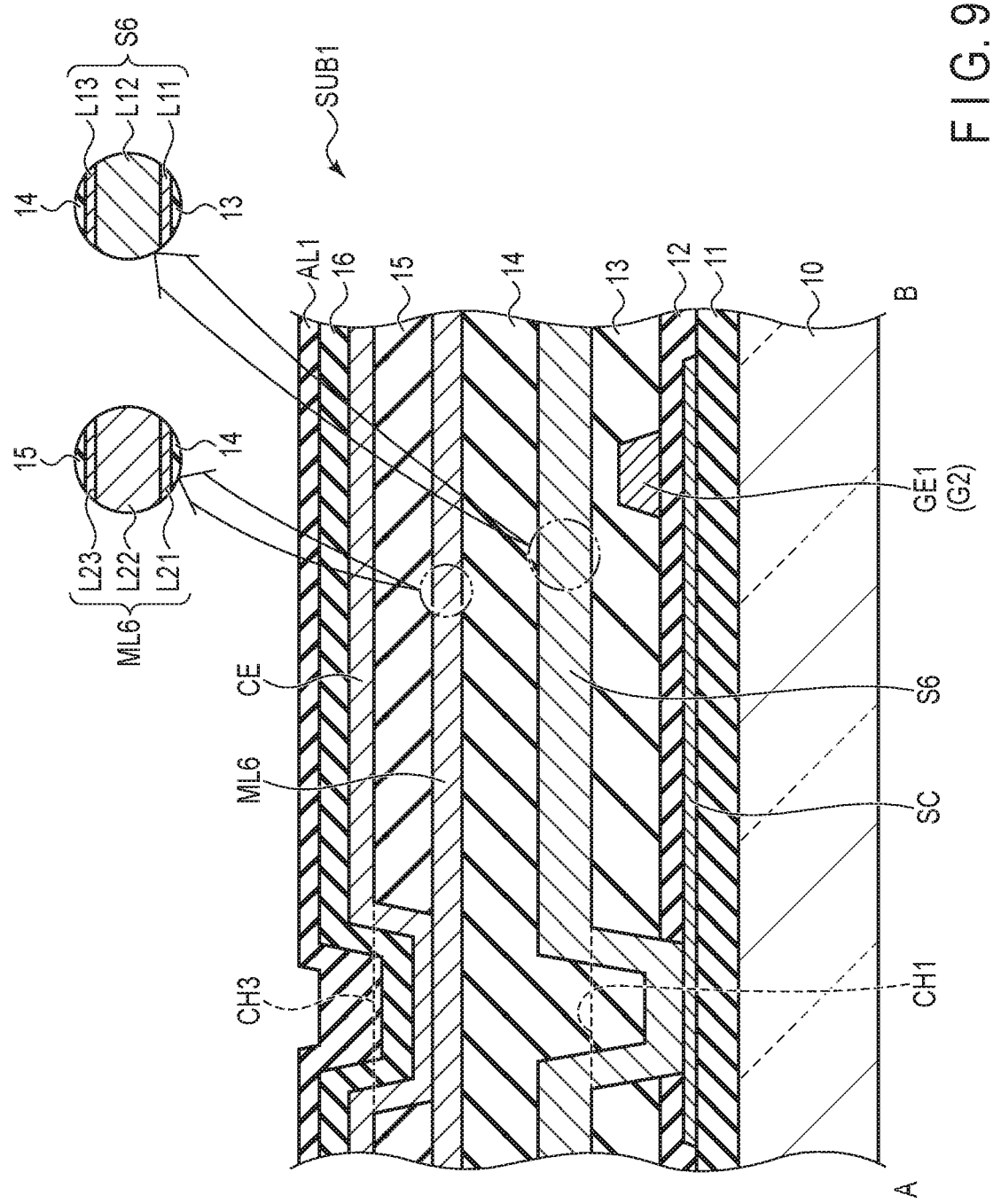
FIG. 9 is a cross-sectional view of a first substrate SUB1 along the A-B line shown in FIG. 8.

FIG. 9 is a cross-sectional view of the first substrate SUB1 along the A-B line shown in FIG. 8.

The first substrate SUB1 comprises insulating substrate 10, insulating films 11 to 16, a semiconductor layer SC, scanning line G2, signal line S6, metal line ML6, a common electrode CE, alignment film AL1, etc.

Insulating substrate 10 is a substrate having a light transmitting property such as a glass substrate or a flexible resinous substrate. Insulating film 11 is located on insulating substrate 10. The semiconductor layer SC is located on insulating film 11 and covered with insulating film 12. The semiconductor layer SC is formed of, for example, polycrystalline silicon. However, the semiconductor layer SC may be formed of amorphous silicon or an oxide semiconductor.

Gate electrode GE1 which is a part of scanning line G2 is located on insulating film 12 and covered with insulating film 13. The other scanning lines which are not shown in the figure are also located in the same layer as scanning line G2. Scanning line G2 is formed of, for example, a metal material such as aluminum (Al), titanium (Ti), silver (Ag), molybdenum (Mo), tungsten (W), copper (Cu) and chromium (Cr), or an alloy prepared by combining these metal materials, and may have either a single-layer structure or a multilayer structure. For example, scanning line G2 is formed of a molybdenum tungsten alloy.

Signal line S6 is located on insulating film 13 and covered with insulating film 14. The other signal lines which are not shown in the figure are also located in the same layer as signal line S6. Signal line S6 is formed of, for example, the above metal materials or an alloy prepared by combining the above metal materials, and may have either a single-layer structure or a multilayer structure. For example, signal line S6 is a stacked layer body in which a first layer L11 containing titanium (Ti), a second layer L12 containing aluminum (Al) and a third layer L13 containing titanium (Ti) are stacked in this order. Signal line S6 is in contact with the semiconductor layer SC through contact hole CH1 penetrating insulating films 12 and 13.

Metal line ML6 is located on insulating film 14 and covered with insulating film 15. Metal line ML6 is formed of, for example, the above metal materials or an alloy prepared by combining the above metal materials, and may have either a single-layer structure or a multilayer structure. For example, metal line ML6 is a stacked layer body in which a fourth layer L21 containing titanium (Ti), a fifth layer L22 containing aluminum (Al) and a sixth layer L23 containing titanium (Ti) are stacked in this order, or a stacked layer body in which a fourth layer L21 containing molybdenum (Mo), a fifth layer L22 containing aluminum (Al) and a sixth layer L23 containing molybdenum (Mo) are stacked in this order.

The common electrode CE is located on insulating film 15 and covered with insulating film 16. The common electrode CE is a transparent electrode formed of a transparent conductive material such as indium tin oxide (ITO) or indium zinc oxide (IZO). The common electrode CE is in contact with metal line ML6 through contact hole CH3 penetrating insulating film 15. Alignment film AL1 is located on insulating film 16.

Insulating films 11 to 13 and insulating film 16 are inorganic insulating films formed of an inorganic insulating material such as silicon oxide, silicon nitride and silicon oxynitride, and may have either a single-layer structure or a multilayer structure. Insulating films 14 and 15 are, for example, organic insulating films formed of an organic insulating material such as acrylic resin. Insulating film 15 may be an inorganic insulating film.

As described above, the common electrode CE also functions as a sensor electrode Rx, and metal line ML6 also functions as a sensor line L and a dummy line D electrically connected to a sensor electrode Rx.

Figure 10:
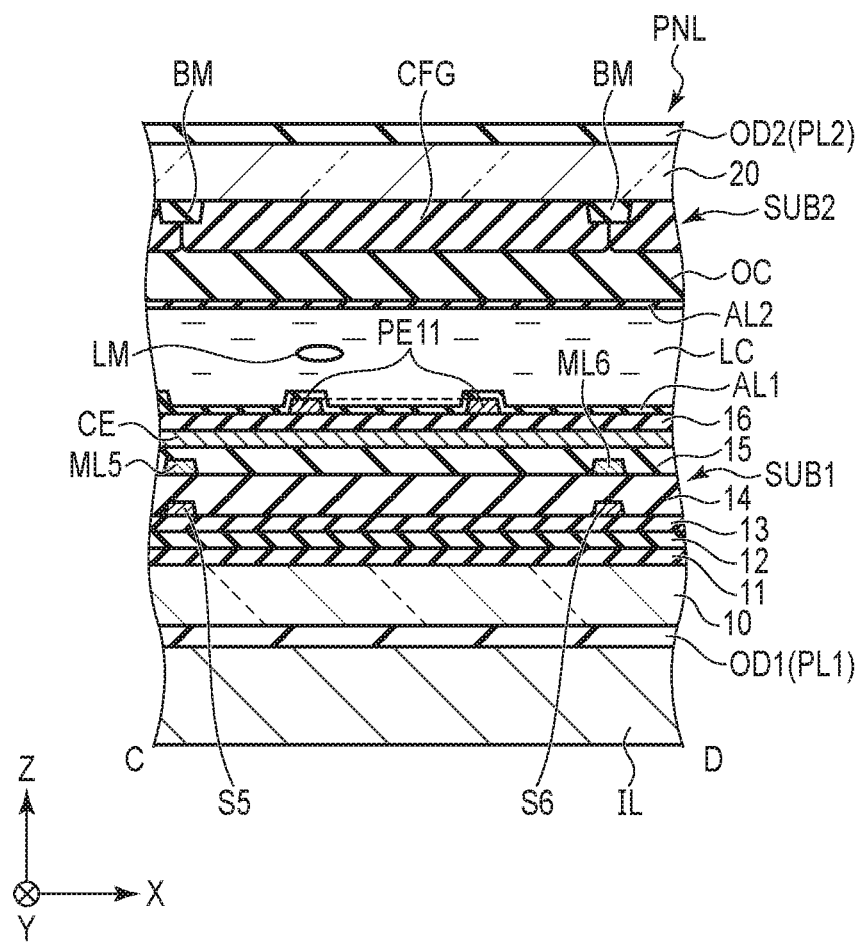
FIG. 10 is a cross-sectional view of the display panel PNL along the C-D line shown in FIG. 8.

FIG. 10 is a cross-sectional view of the display panel PNL along the C-D line shown in FIG. 8. The example shown in the figure is equivalent to an example to which a fringe field switching (FFS) mode, which is one of the display modes using a lateral electric field, is applied.

In the first substrate SUB1, signal lines S5 and S6 are located on insulating film 13 and covered with insulating film 14. Metal lines ML5 and ML6 are located immediately above signal lines S5 and S6, respectively. Pixel electrodes PE11 are located on insulating film 16 and covered with alignment film AL1. Each pixel electrode PE11 is a transparent electrode formed of a transparent conductive material such as ITO and IZO.

The second substrate SUB2 comprises insulating substrate 20, light-shielding layer BM, color filter CFG, an overcoat layer OC, alignment film AL2, etc.

Insulating substrate 20 is a substrate having a light transmitting property such as a glass substrate or a resinous substrate in a manner similar to that of insulating substrate 10. Light-shielding layer BM and color filter CFG are located on the side facing the first substrate SUB1 in insulating substrate 20. Color filter CFG is provided at a position facing pixel electrodes PE11 and partially overlaps light-shielding layer BM. The overcoat layer OC covers color filter CFG. The overcoat layer OC is formed of transparent resin. In a manner similar to that of color filter CFG, the other color filters CFR and CFB are also provided at positions facing pixel electrodes PE and covered with the overcoat layer OC. Alignment film AL2 covers the overcoat layer OC. Alignment films AL1 and AL2 are formed of, for example, a material exhibiting a horizontal alignment property.

The above first substrate SUB1 and the second substrate SUB2 are provided such that alignment films AL1 and AL2 face each other. Although not shown in the figure, the above main spacer MSP and sub-spacers SSP are formed of a resinous material and provided between the first substrate SUB1 and the second substrate SUB2. The main spacer MSP forms a predetermined cell gap between the first substrate SUB1 and the second substrate SUB2. The cell gap has a length of, for example, 2 to 5 µm. The first substrate SUB1 and the second substrate SUB2 are attached to each other by a sealing member in a state where a predetermined cell gap is formed.

The liquid crystal layer LC is located between the first substrate SUB1 and the second substrate SUB2 and held between alignment film AL1 and alignment film AL2. The liquid crystal layer LC comprises liquid crystal molecules LM. The liquid crystal layer LC is formed of a positive liquid crystal material (the dielectric anisotropy is positive) or a negative liquid crystal material (the dielectric anisotropy is negative).

Optical element OD1 including polarizer PL1 is attached to insulating substrate 10. Optical element OD2 including polarizer PL2 is attached to insulating substrate 20. Optical elements OD1 and OD2 may comprise a retardation film, a scattering layer, an antireflective layer, etc., depending on the need.

In this display panel PNL, in an off-state where an electric field is not formed between the pixel electrodes PE and the common electrode CE, the liquid crystal molecules LM are initially aligned in a predetermined direction between alignment films AL1 and AL2. In this off-state, the light emitted from an illumination device IL to the display panel PNL is absorbed by optical elements OD1 and OD2, thereby performing dark display. In an on-state where an electric field is formed between the pixel electrodes PE and the common electrode CE, the liquid crystal molecules LM are aligned in a direction different from the initial alignment direction by the electric field. The alignment direction is controlled by the electric field. In this on-state, the light from the illumination device IL partially passes through optical elements OD1 and OD2, thereby performing light display.

Figure 11:
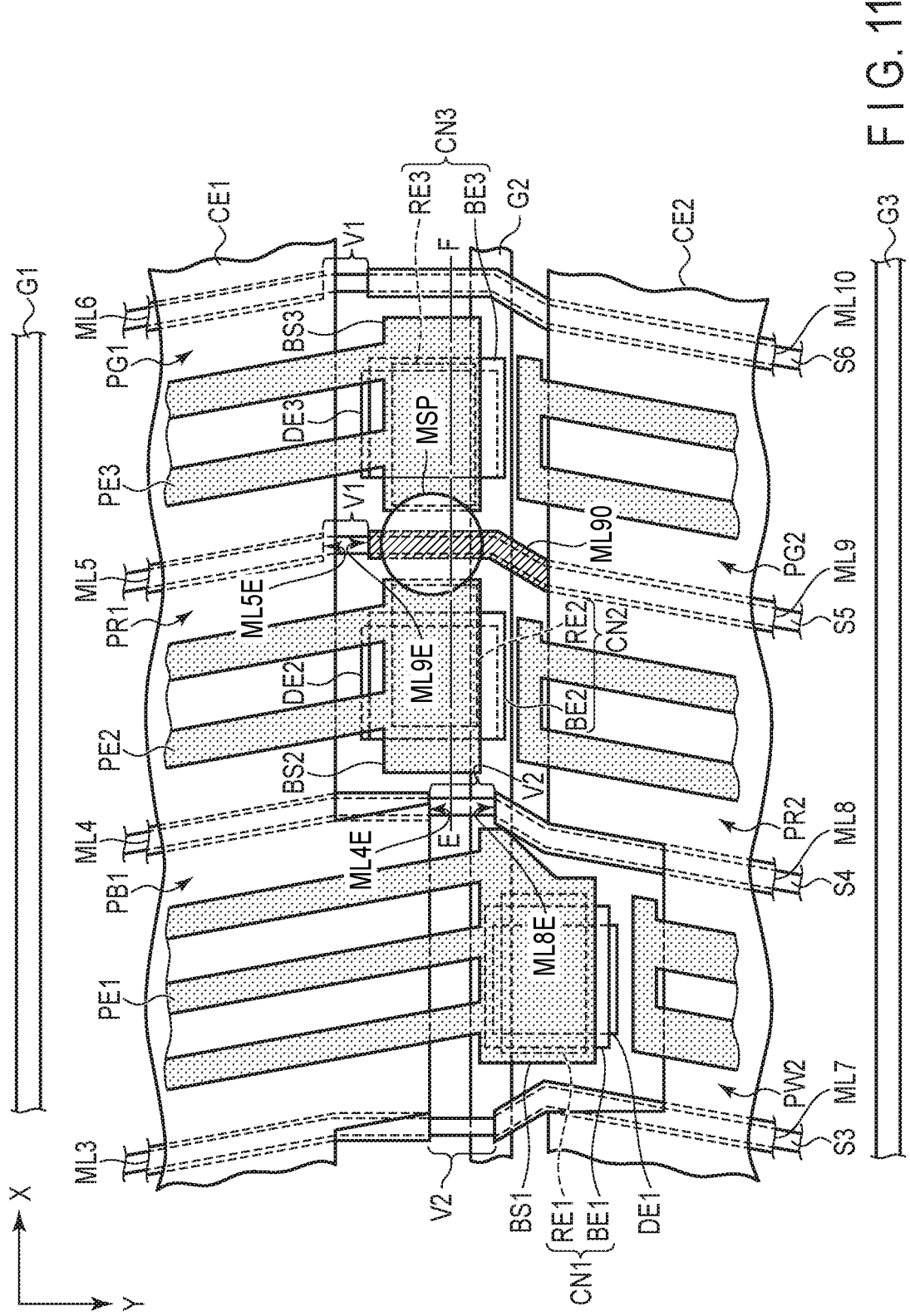
FIG. 11 is a plan view showing an example of blue pixel PB1, red pixel PR1 and green pixel PG1 arranged in a first direction X.

FIG. 11 is a plan view showing an example of blue pixel PB1, red pixel PR1 and green pixel PG1 arranged in the first direction X. Here, for convenience sake, the pixel electrodes and drain electrodes provided in blue pixel PB1, red pixel PR1 and green pixel PG1 are denoted by different reference numbers such that they can be distinguished from each other.

Blue pixel PB1 comprises pixel electrode PE1, drain electrode DE1, first connection electrode BE1 and second connection electrode RE1. First connection electrode BE1 and second connection electrode RE1 overlap base portion BS1 and drain electrode DE1, and structure connection portion CN1 electrically connecting pixel electrode PE1 and drain electrode DE1. Drain electrode DE1, base portion BS1 and connection portion CN1 are located between scanning lines G2 and G3.

In a manner similar to that of blue pixel PB1, red pixel PR1 comprises pixel electrode PE2, drain electrode DE2 and connection portion CN2, and connection portion CN2 comprises first connection electrode BE2 and second connection electrode RE2. In a manner similar to that of blue pixel PB1, green pixel PG1 comprises pixel electrode PE3, drain electrode DE3 and connection portion CN3, and connection portion CN3 comprises first connection electrode BE3 and second connection electrode RE3. Drain electrodes DE2 and DE3, base portions BS2 and BS3 and connection portions CN2 and CN3 are located between scanning lines G1 and G2.

Connection portion CN2 and connection portion CN3 are arranged on the same straight line in the first direction X. Connection portion CN1 is provided at a position deviating from the same straight line as connection portions CN2 and CN3. Drain electrodes DE2 and DE3 are arranged on the same straight line in the first direction X. Drain electrode DE1 is provided at a position deviating from the same straight line as drain electrodes DE2 and DE3.

Common electrode CE1 is provided over blue pixel PB1, red pixel PR1 and green pixel PG1. Common electrode CE1 protrudes to a side close to scanning line G2 in blue pixel PB1. Common electrode CE2 is spaced apart from common electrode CE1. Common electrode CE2 is provided over white pixel PW2, red pixel PR2 and green pixel PG2. Common electrode CE2 is depressed to a side separating from scanning line G2 in white pixel PW2. In the example shown in the figure, common electrodes CE1 and CE2 are electrically insulated from each other. As described later, common electrodes CE1 and CE2 may be electrically connected to each other via a bridge portion. Scanning line G2, drain electrodes DE1 to DE3, connection portions CN1 to CN3 and base portions BS1 to BS3 are located between common electrodes CE1 and CE2.

Here, this specification focuses on the positional relationships of signal line S5, metal lines ML5 and ML9, common electrodes CE1 and CE2 and the main spacer MSP.

Signal line S5 is located between drain electrodes DE2 and DE3, between connection portions CN2 and CN3 or between pixel electrodes PE2 and PE3. Signal line S5 overlaps common electrodes CE1 and CE2. Metal line ML9 overlaps signal line S5 and common electrode CE2. Metal line ML5 overlaps signal line S5 and common electrode CE1. Metal line ML5 is spaced apart from metal line ML9 across an intervening first gap V1. Metal line ML9 comprises extension portion ML90 extending between common electrode CE1 and common electrode CE2. Extension portion ML90 intersects with scanning line G2 in a plan view, and is located between drain electrodes DE2 and DE3, between connection portions CN2 and CN3 or between base portions BS2 and BS3. End portion ML9E of metal line ML9 (or extension portion ML90) overlaps signal line S5, and is located between common electrodes CE1 and CE2. End portion ML5E of metal line ML5 faces end portion ML9E across the intervening first gap V1, overlaps signal line S5 and overlaps common electrode CE1. End portion ML9E is closer to scanning line G2 than end portion ML5E. End portion ML5E is closer to scanning line G1 than end portion ML9E. Signal line S5 is exposed between end portions ML5E and ML9E. In the example shown in the figure, in the first gap V1, a part of signal line S5 overlaps common electrode CE1. The main spacer MSP is located between common electrode CE1 and common electrode CE2 and overlaps extension portion ML90. The main spacer MSP is located between drain electrodes DE2 and DE3, between connection portions CN2 and CN3 or between base portions BS2 and BS3. In the example shown in the figure, the main spacer MSP overlaps each of base portions BS2 and BS3 and second connection electrodes RE2 and RE3.

Next, this specification focuses on the positional relationships of the signal line S4, metal lines ML4 and ML8, and common electrodes CE1 and CE2.

Signal line S4 is located between drain electrodes DE1 and DE2, between connection portions CN1 and CN2 or between pixel electrodes PE1 and PE2. Signal line S4 overlaps common electrodes CE1 and CE2. Metal line ML8 overlaps signal line S4 and common electrode CE2. Metal line ML4 overlaps signal line S4 and common electrode CE1. Metal line ML4 is spaced apart from metal line ML8 across an intervening second gap V2. End portion ML8E of metal line ML8 overlaps signal line S4, and is located between common electrodes CE1 and CE2. In the example shown in the figure, end portion ML8E overlaps scanning line G2, and end portion ML8E and base portion BS1 are arranged side by side in the first direction X. End portion ML4E of metal line ML4 overlaps signal line S4 and faces end portion ML8E across the intervening second gap V2. In the example shown in the figure, end portion ML4E is located between scanning lines G1 and G2, and end portion ML4E and base portion BS2 are arranged side by side in the first direction X. End portion ML8E is closer to scanning line G2 than end portion ML4E. End portion ML4E is closer to scanning line G1 than end portion ML8E. Signal line S4 is exposed between end portions ML4E and ML8E.

The second gap V2 is closer to scanning line G2 than the first gap V1. End portion ML8E is closer to scanning line G2 than end portion ML9E. End portion ML4E is closer to scanning line G2 than end portion MLSE.

Similarly, each of signal lines S3 and S6 overlaps common electrodes CE1 and CE2. Metal lines ML3 and ML7 overlap signal line S3. Metal line ML3 is spaced apart from metal line ML7 across the intervening second gap V2. Metal lines ML6 and ML10 overlap signal line S6. Metal line ML6 is spaced apart from metal line ML10 across the intervening first gap V1.

Drain electrodes DE1 to DE3 are located in the same layer as signal lines S3 to S6, and are formed of the same material as signal lines S3 to S6. First connection electrodes BE1 to BE3 are located in the same layer as metal lines ML3 to ML10, and are formed of the same material as metal lines ML3 to ML10. Second connection electrodes RE1 to RE3 are located in the same layer as common electrodes CE1 and CE2, and are formed of the same material as common electrodes CE1 and CE2. Pixel electrode PE1 is equivalent to pixel electrode PE12 shown in FIG. 5. Both pixel electrode PE2 and pixel electrode PE3 are equivalent to each pixel electrode PE11 shown in FIG. 5. Pixel electrode PE1 is longer than pixel electrodes PE2 and PE3 in the second direction Y.

In the example shown in FIG. 11, signal line S5 is equivalent to a first signal line. Signal line S4 is equivalent to a second signal line. Scanning line G1 is equivalent to a first scanning line. Scanning line G2 is equivalent to a second scanning line. Scanning line G3 is equivalent to a third scanning line. Metal line ML9 is equivalent to a first metal line. End portion ML9E is equivalent to a first end portion. Metal line ML5 is equivalent to a second metal line. End portion MLSE is equivalent to a second end portion. Metal line ML8 is equivalent to a third metal line. Metal line ML4 is equivalent to a fourth metal line. Common electrode CE2 is equivalent to a first common electrode. Common electrode CE1 is equivalent to a second common electrode. Drain electrode DE2 is equivalent to a first drain electrode. Drain electrode DE3 is equivalent to a second drain electrode. Drain electrode DE1 is equivalent to a third drain electrode. Pixel electrode PE2 is equivalent to a first pixel electrode. Pixel electrode PE3 is equivalent to a second pixel electrode. Pixel electrode PE1 is equivalent to a third pixel electrode.

Figure 12:
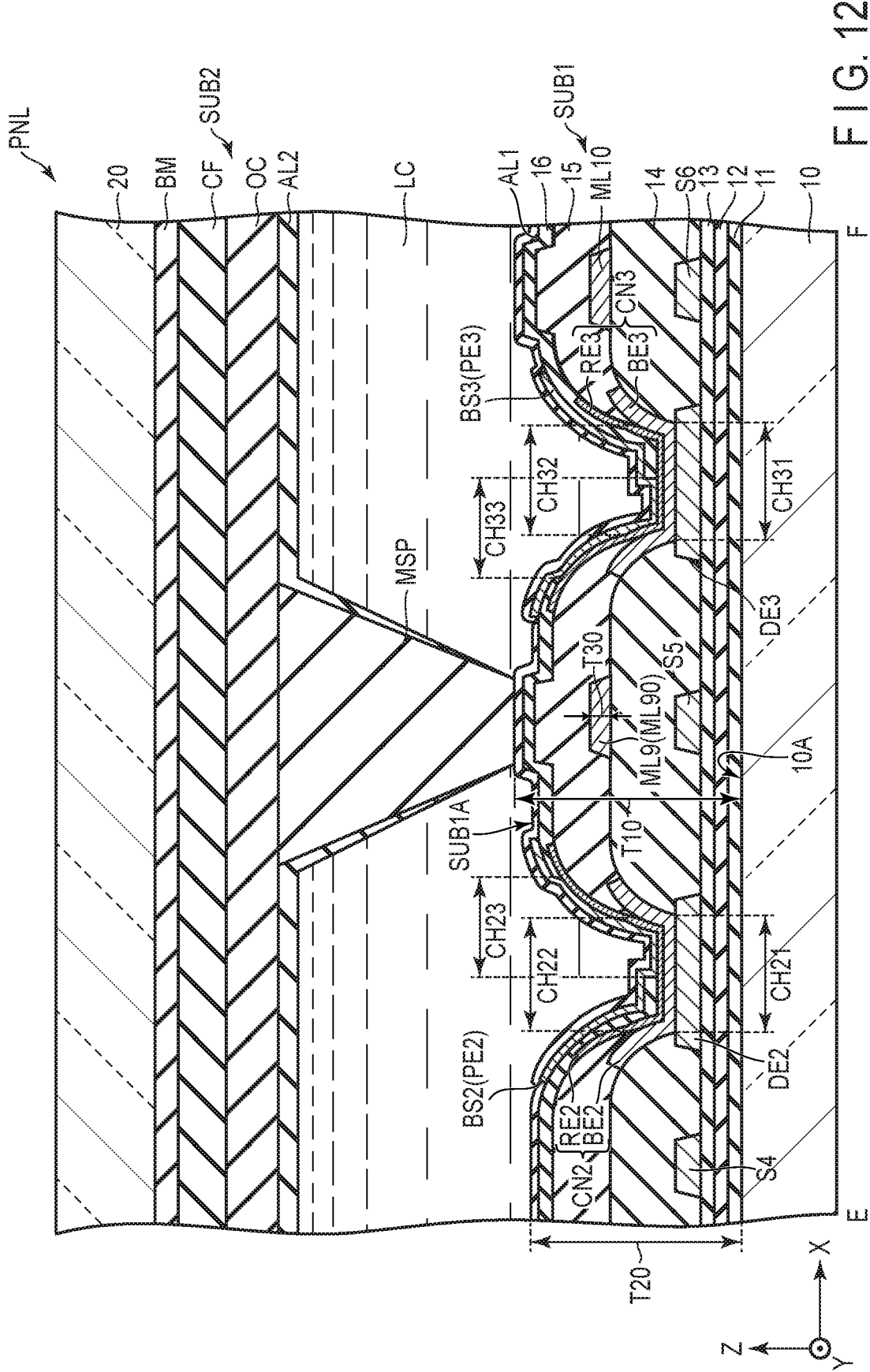
FIG. 12 is a cross-sectional view of the display panel PNL along the E-F line shown in FIG. 11.

FIG. 12 is a cross-sectional view of the display panel PNL along the E-F line shown in FIG. 11. The illustration of the semiconductor layer located between insulating film 11 and insulating film 12 is omitted.

Signal lines S4 to S6 and drain electrodes DE2 and DE3 are located on insulating film 13 and covered with insulating film 14. Insulating film 14 comprises through-holes CH21 and CH31 penetrating to surfaces of drain electrodes DE2 and DE3, respectively.

Metal lines ML9 and ML10 and first connection electrodes BE2 and BE3 are located on insulating film 14 and covered with insulating film 15. First connection electrode BE2 is in contact with drain electrode DE2 in through-hole CH21. Similarly, first connection electrode BE3 is in contact with drain electrode DE3 in through-hole CH31. Metal line ML9 is located immediately above signal line S5, and metal line ML10 is located immediately above signal line S6. In the cross-section shown in the figure, immediately above signal line S4, no metal line is provided, and the second gap V2 shown in FIG. 11 is located.

Insulating film 15 comprises through-holes CH22 and CH32 penetrating to first connection electrodes BE2 and BE3, respectively. Insulating film 15 is in contact with insulating film 14 between first connection electrode BE2 and metal line ML9 and between first connection electrode BE3 and metal line ML9. In addition, insulating film 15 is in contact with insulating film 14 immediately above signal line S4 (the second gap V2).

Second connection electrodes RE2 and RE3 are located on insulating film 15 and covered with insulating film 16. Second connection electrode RE2 is in contact with first connection electrode BE2 in through-hole CH22. Similarly, second connection electrode RE3 is in contact with first connection electrode BE3 in through-hole CH32. In the example shown in the figure, second connection electrode RE2 leans to the right side of the figure or to a side close to signal line S5 and metal line ML9. Similarly, second connection electrode RE3 leans to the left side of the figure or to a side close to signal line S5 and metal line ML9.

Insulating film 16 comprises through-holes CH23 and CH33 penetrating to second connection electrodes RE2 and RE3, respectively. Through-hole CH23 leans to the right side of the figure with respect to through-hole CH22. Through-hole CH33 leans to the left side of the figure with respect to through-hole CH32. Between second connection electrodes RE2 and RE3, insulating film 16 is in contact with insulating film 15.

Base portion BS2 of pixel electrode PE2 is located on insulating film 16 and covered with alignment film AL1. Pixel electrode PE2 is in contact with second connection electrode RE2 in through-hole CH23. Similarly, pixel electrode PE3 is in contact with second connection electrode RE3 in through-hole CH33. Pixel electrodes PE2 and PE3 should be at least electrically connected to first connection electrodes BE2 and BE3, respectively. Second connection electrodes RE2 and RE3 may be omitted.

In the example shown in FIG. 12, through-hole CH21 is equivalent to a first through-hole. Insulating film 14 is equivalent to a first insulating film. Through-hole CH22 is equivalent to a second through-hole. Insulating film 15 is equivalent to a second insulating film. Through-hole CH23 is equivalent to a third through-hole. Insulating film 16 is equivalent to a third insulating film.

The main spacer MSP is located immediately above signal line S5 and metal line ML9 (extension portion ML90) and is in contact with alignment film AL1. The first substrate SUB1 comprises upper surface SUB1A facing the second substrate SUB2. Here, upper surface SUB1A is equivalent to the upper surface of alignment film AL1. Insulating substrate 10 comprises upper surface 10A facing the second substrate SUB2. The first substrate SUB1 has thickness T10 at a position overlapping metal line ML9 and signal line S5. The first substrate SUB1 has thickness T20 at a position overlapping signal line S4. Thicknesses T10 and T20 are equivalent to the length from upper surface 10A to upper surface SUB1A in the third direction Z. Metal line ML9 has thickness T30 in the third direction Z. For example, thickness T30 is 300 nm. Upper surface SUB1A protrudes to the second substrate SUB2 side at a position overlapping metal line ML9 and signal line S5 in comparison with a position overlapping signal line S4. In other words, thickness T10 is greater than thickness T20 because of the effect of thickness T30. The main spacer MSP is in contact with, of upper surface SUB1A, a position overlapping metal line ML9 and signal line S5. Between metal line ML9 (extension portion ML90) and the main spacer MSP, insulating films 15 and 16 are in contact with each other.

Figure 13:
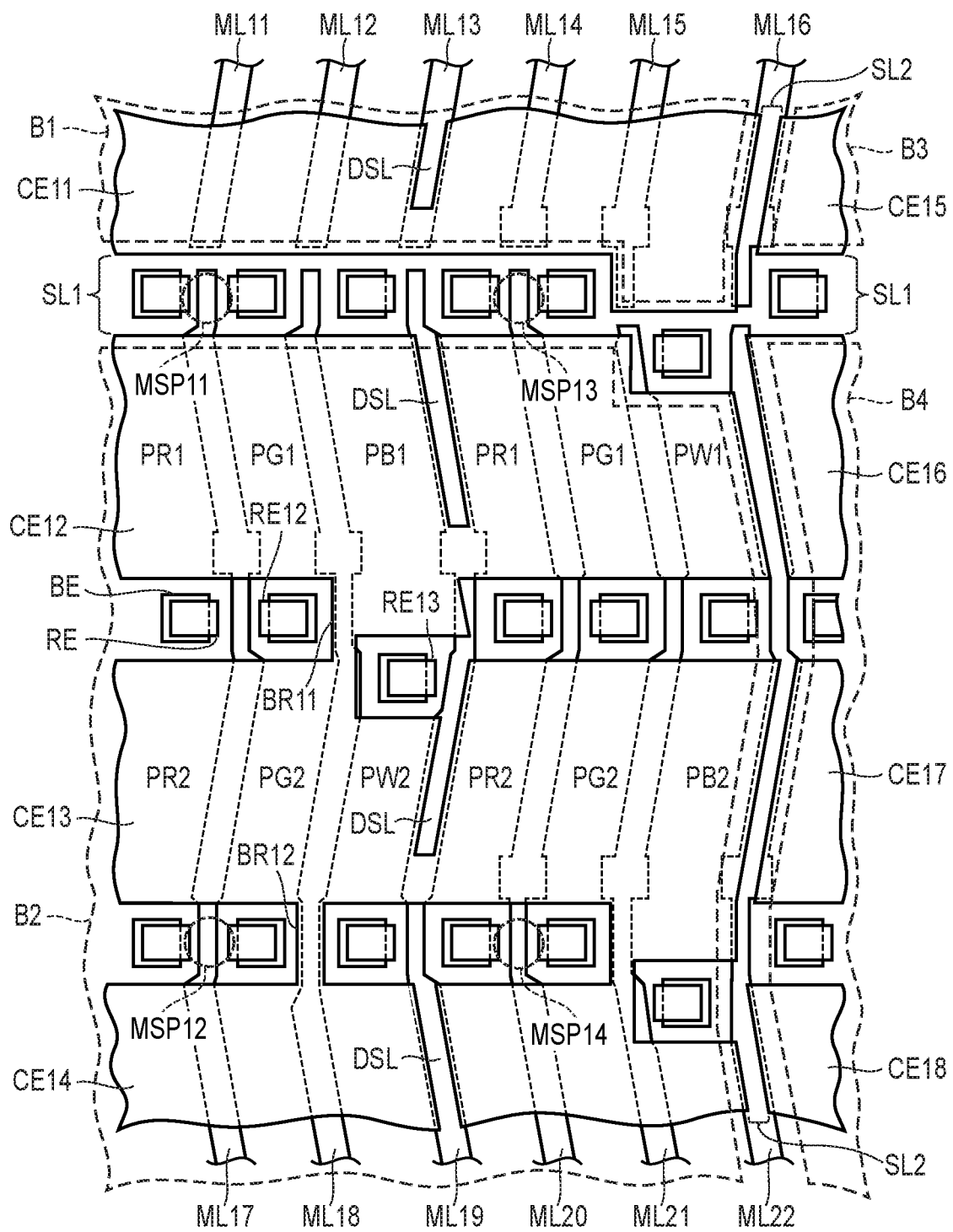
FIG. 13 is a plan view showing an example of a layout for explaining the positional relationship between metal lines and main spacers MSP.

FIG. 13 is a plan view showing an example of a layout for explaining the positional relationship between the metal lines and the main spacers. Here, of the first substrate SUB1, only metal lines ML11 to ML22, common electrodes CE11 to CE18, first connection electrode BE and second connection electrode RE are shown. The positions at which the main spacers MSP are in contact with the first substrate SUB1 are shown by dashed lines.

FIG. 13 is an enlarged view of, for example, an area in which four sensor blocks B1, B2, B3 and B4 shown in FIG. 2 are adjacent to each other. As shown in FIG. 2, sensor block B1 is adjacent to sensor block B2 in the second direction Y. Sensor block B3 is adjacent to sensor block B4 in the second direction Y. Sensor block B1 is adjacent to sensor block B3 in the first direction X. Sensor block B2 is adjacent to sensor block B4 in the first direction X. Common electrode CE11 is provided in sensor block B1. Common electrodes CE12 to CE14 are electrically connected to each other and provided in sensor block B2. Common electrode CE15 is provided in sensor block B3. Common electrodes CE16 to CE18 are electrically connected to each other and provided in sensor block B4.

Slit SL1 is provided between common electrodes CE11 and CE12 and separates sensor block B1 from sensor block B2. Another slit SL1 is also provided between common electrodes CE15 and CE16 and separates sensor block B3 from sensor block B4. Slit SL2 is provided between common electrodes CE11 and CE15 and separates sensor block B1 from sensor block B3. Another slit SL2 is also provided between common electrodes CE12 and CE16, between common electrodes CE13 and CE17 and between common electrodes CE14 and CE18 and separates sensor block B2 from sensor block B4. Each of Metal lines ML16 and ML22 overlaps slit SL2.

In FIG. 13, a dummy slit DSL is formed in, for example, each of common electrodes CE11 to CE14. Metal line ML19 overlaps the dummy slits DSL. In common electrode CE12, the dummy slit DSL is formed along the boundary between blue pixel PB1 and red pixel PR1. The dummy slit DSL does not electrically separate common electrode CE12 into the blue pixel PB1 side and the red pixel PR1 side. In other words, in common electrode CE12, the blue pixel PB1 side is electrically connected to the red pixel PR1 side in an area where the dummy slit is not formed. With regard to the dummy slits DSL, common electrodes CE11, CE13 and CE14 have the same structure. Since the dummy slits DSL are formed, slit 12 between sensor blocks B adjacent to each other right and left in the figure can be made inconspicuous when the whole display device is viewed.

Metal lines ML17 to ML20 extend between common electrodes CE1 and CE2. Main spacer MSP11 is located near the gap between metal lines ML11 and ML17. However, main spacer MSP11 overlaps metal line ML17 between common electrodes CE11 and CE12. Between common electrodes CE13 and CE14, main spacer MSP12 overlaps a portion in which metal line ML17 is continuously formed. Similarly, both main spacer MSP13 and main spacer MSP14 overlap metal line ML20. All the overlapping positions of these main spacers MSP11 to MSP14 have the cross-sectional structure shown in FIG. 12.

In the figure, at positions overlapping metal line ML18, bridge portion BR11 connecting common electrode CE12 and common electrode CE13 is provided, and bridge portion BR12 connecting common electrode CE13 and common electrode CE14 is provided. These bridge portions BR11 and BR12 are integrally formed with common electrodes CE12 to CE14. For example, bridge portions BR11 and BR12 are located between the green pixel PG and the blue pixel PB or between the green pixel PG and the white pixel PW. In the example shown in the figure, the main spacers MSP do not overlap any bridge portion.

When this specification focuses on bridge portion BR11, bridge portion BR11 is located between second connection electrodes RE12 and RE13. Second connection electrodes RE12 and RE13 deviate to sides separating from each other. In this layout, although common electrodes CE12 and CE13 and bridge portion BR11 are located in the same layer as second connection electrodes RE12 and RE13, second connection electrodes RE12 and RE13 deviate to sides separating from each other. Thus, it is possible to prevent a short circuit with respect to bridge portion BR11.

In the present embodiment, at a position which is in contact with each main spacer MSP, the first substrate SUB1 comprise insulating substrate 10, insulating films 11 to 16, alignment film AL1, the signal line S and the metal line ML, and has thickness T10. The first substrate SUB1 has substantially a certain thickness as the cross-sectional structure of the first substrate SUB1 is made uniform at a position which is in contact with each main spacer MSP regardless of the layout of various lines or the layout of the pixels. Thus, the uniformity of the cell gap between the first substrate SUB1 and the second substrate SUB2 can be improved. In this way, it is possible to prevent the degradation in the display quality of the display device DSP.

As insulating film 15 which is an organic insulating film is interposed between the main spacer MSP and metal line ML9, even if a force pressing the display panel PNL is applied to the first substrate SUB1 via the main spacer MSP, the damage to the meal line ML can be reduced.

Figure 14:
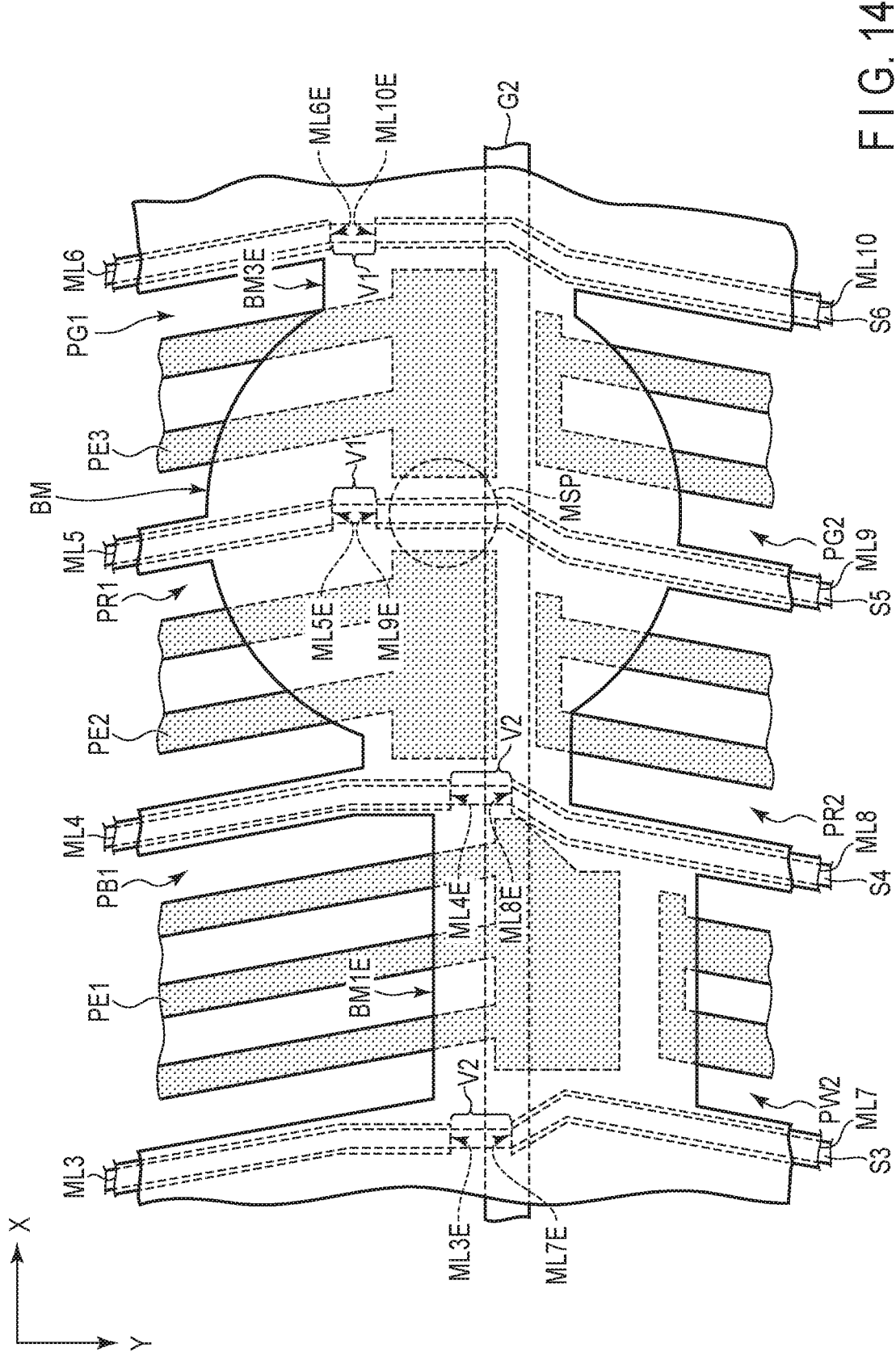
FIG. 14 is a plan view showing light-shielding layer BM corresponding to the main spacer MSP of FIG. 11.

FIG. 14 is a plan view showing light-shielding layer BM corresponding to the main spacer MSP of FIG. 11. Here, the illustration of scanning lines G1 to G3, connection portions CN1 to CN3 and common electrodes CE1 and CE2 are omitted.

In the example shown in the figure, end portion ML3E and end portion ML4E are located on the same straight line in the first direction X. End portion ML5E and end portion ML6E are located on the same straight line in the first direction X. End portion ML3E and end portion ML4E deviate to the scanning line G2 side from the straight line connecting end portion ML5E and end portion ML6E. Similarly, end portion ML7E and end portion ML8E are located on the same straight line in the first direction X. End portion ML9E and end portion ML10E are located on the same straight line in the first direction X. End portion ML7E and end portion ML8E deviate to the scanning line G2 side from the straight line connecting end portion ML9E and end portion ML10E.

Light-shielding layer BM overlaps the first gap V1 and the second gap V2. Light-shielding layer BM overlaps all of end portions ML3E to ML10E. Light-shielding layer BM comprises sides BM1E and BM3E extending in the first direction X. Side BM1E is located between signal line S3 and signal line S4. Side BM3E is located between signal line S5 and signal line S6. Side BM1E is closer to scanning line G2 than side BM3E. Light-shielding layer BM is extended over red pixel PR1 and green pixel PG1 from a position overlapping the main spacer MSP between sides BM1E and BM3E. End portions ML3E and ML4E are located so as to be closer to the scanning line G2 side or the white pixel PW2 side than side BM1E in the second direction Y. End portions ML5E and ML6E are located so as to be closer to the scanning line G2 side or the green pixel PG1 side than side BM3E in the second direction Y.

In the present embodiment, the area in which the first gap V1 is adjacent to pixel electrodes PE2 and PE3 and the area in which the second gap V2 is adjacent to pixel electrode PE1 are shielded from light by light-shielding layer BM. In this way, even if an undesired electric field for erroneously operating the liquid crystal molecules LM is generated between signal line S5 and pixel electrodes PE2 and PE3 in the first gap V1 and between signal line S4 and pixel electrode PE1 in the second gap V2, these areas do not contribute to display, thereby preventing the degradation in display quality.

FIG. 15 is a plan view in which a part of the touch sensor TS shown in FIG. 2 is enlarged. Here, of the touch sensor TS shown in FIG. 2, sensor electrodes Rx1 and Rx2, sensor lines L1 and L2 and the touch controller TC are shown.

Sensor electrodes Rx1 and Rx2 are arranged side by side in the second direction Y at an interval. Sensor line L1 overlaps sensor electrodes Rx1 and Rx2 and extends between sensor electrode Rx1 and sensor electrode Rx2. Sensor line L1 is electrically connected to sensor electrode Rx1. Sensor line L2 overlaps sensor electrode Rx2 and is electrically connected to sensor electrode Rx2. Sensor line L2 extends between sensor electrode Rx1 and sensor electrode Rx2. However, sensor line L2 does not overlap sensor electrode Rx1.

A first main spacer MSP1 overlaps sensor line L1 between sensor electrode Rx1 and sensor electrode Rx2. A second main spacer MSP2 overlaps sensor line L2 between sensor electrode Rx1 and sensor electrode Rx2. In the example shown in the figure, main spacer MSP1 and main spacer MSP2 are arranged side by side in the first direction X.

Sensor lines L1 and L2 are connected to the touch controller TC. Sensor electrode Rx2 is closer to the touch controller TC than sensor electrode Rx1.

In the example shown in FIG. 15, sensor electrode Rx1 is equivalent to a first sensor electrode. Sensor electrode Rx2 is equivalent to a second sensor electrode. Sensor line L1 is equivalent to a first sensor line. Sensor line L2 is equivalent to a second sensor line.

In this touch sensor TS, sensor line L2 electrically connected to sensor electrode Rx2 is structured so as to extend between sensor electrodes Rx1 and Rx2 in order to cause sensor line L2 to overlap the second main spacer MSP2. Thus, the underlying cross-sectional structure which is in contact with each of the first main spacer MSP1 and the second main spacer MSP2 can be made uniform. The uniformity of the cell gap in the electronic device comprising the built-in touch sensor TS can be improved.

As explained above, the present embodiment can provide a display device which can prevent the degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the present embodiment, the pixel widths of each red pixel, green pixel and white pixel are equal to each other. However, these pixel widths may be different from each other. In the present embodiment, the pixel electrodes of each red pixel, green pixel and white pixel have the same shape. However, the shapes of these pixel electrodes may be different from each other.

What is claimed is:

1. A display device comprising:
a plurality of pixels in a display area;
a plurality of common electrodes arranged in a matrix in the display area;
an organic insulating layer;
a first insulating layer laminated on the organic insulating layer;
a metal line between the organic insulating layer and the first insulating layer;
a second insulating layer laminated on the first insulating layer; and
an alignment film covering the second insulating layer, wherein
the plurality of pixels have a first pixel and a second pixel adjacent to the first pixel in a first direction,
a first common electrode is one of the plurality of common electrodes,
each of the first pixel and the second pixel overlaps the first common electrode,
the first common electrode has a first slit integrally formed over the first pixel and the second pixel,
the first common electrode has a second slit formed along a boundary between the first pixel and the second pixel,
the second slit is connected to the first slit,
the first pixel has a first drain electrode of a first thin film transistor and a first pixel electrode,
the second pixel has a second drain electrode of a second thin film transistor and a second pixel electrode,
the first pixel electrode is connected to the first drain electrode at inside of the first slit,
the second pixel electrode is connected to the second drain electrode at inside of the first slit,
each of the plurality of common electrodes is separated by a third slit,
the first slit and the second slit are not connected to the third slit,
the organic insulating layer covers the first thin film transistor and the second thin film transistor,
the first common electrode is between the first insulating layer and the second insulating layer,
the first pixel electrode and the second pixel electrode are between the second insulating layer and the alignment film,
the metal line extends along the boundary of the first pixel and the second pixel,
the metal line overlaps the second slit, and
a part of the first common electrode overlaps the metal line at the boundary of the first pixel and the second pixel.

2. The display device of claim 1, wherein the plurality of common electrodes function as a plurality of touch sensor electrodes.

3. The display device of claim 1, wherein
the first pixel is a blue color pixel, and
the second pixel is a red color pixel.

4. The display device of claim 1, wherein
the first pixel is a white color pixel, and
the second pixel is a red color pixel.

5. The display device of claim 1, wherein
the plurality of pixels further have a third pixel adjacent to the first pixel in a second direction intersecting with the first direction, and a fourth pixel adjacent to the second pixel in the second direction,
each of the third pixel and the fourth pixel overlaps the first common electrode,
the first common electrode has a fourth slit integrally formed over the third pixel and the fourth pixel, and
the second slit is not connected to the fourth slit.

6. The display device of claim 1, wherein
the metal line has an end portion, and
the end portion is located inside of the third slit.

* * * * *